(12) United States Patent
Hashimoto

(10) Patent No.: US 9,146,699 B2
(45) Date of Patent: Sep. 29, 2015

(54) SYSTEM FOR CONTROLLING TOTAL POWER CONSUMPTION OF PLURAL APPARATUSES AND CONTROL METHOD THEREOF

(75) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 13/218,999

(22) Filed: Aug. 26, 2011

(65) Prior Publication Data

US 2012/0060041 A1 Mar. 8, 2012

(30) Foreign Application Priority Data

Sep. 2, 2010 (JP) ................................ 2010-197144

(51) Int. Cl.
| | |
|---|---|
| G06F 1/26 | (2006.01) |
| G06F 3/12 | (2006.01) |
| G03G 15/00 | (2006.01) |
| G06F 1/32 | (2006.01) |
| H04N 1/00 | (2006.01) |
| H04N 1/32 | (2006.01) |

(52) U.S. Cl.
CPC .......... *G06F 3/1213* (2013.01); *G03G 15/5004* (2013.01); *G03G 15/5083* (2013.01); *G06F 1/3209* (2013.01); *G06F 1/3284* (2013.01); *G06F 3/1221* (2013.01); *G06F 3/1229* (2013.01); *G06F 3/1285* (2013.01); *H04N 1/00344* (2013.01); *H04N 1/00896* (2013.01); *H04N 1/32502* (2013.01); *H04N 2201/0074* (2013.01); *H04N 2201/0082* (2013.01); *H04N 2201/0094* (2013.01); *Y02B 60/1267* (2013.01); *Y02B 60/1271* (2013.01)

(58) Field of Classification Search
None
See application file for complete search history.

(56) References Cited

U.S. PATENT DOCUMENTS

| | | | |
|---|---|---|---|
| 7,383,448 B2 | 6/2008 | Kohara | |
| 2003/0191975 A1 | 10/2003 | Kohara | |

(Continued)

FOREIGN PATENT DOCUMENTS

| | | |
|---|---|---|
| CN | 1449924 A | 10/2003 |
| JP | 2001-199131 A | 7/2001 |

(Continued)

OTHER PUBLICATIONS

Nov. 7, 2013 Chinese Official Action in Chinese Patent Appln. No. 201110260899.7.

*Primary Examiner* — Paul Yanchus, III
(74) *Attorney, Agent, or Firm* — Fitzpatrick, Cella, Harper & Scinto

(57) ABSTRACT

A system according to the present invention includes a server and a plurality of apparatuses each incorporating a device. The apparatuses control power supply ON and OFF states of the devices in accordance with an instruction from the server. The server collects pieces of operation state information indicating operation states of the apparatuses from the apparatuses, and groups, based on the collected information, the apparatuses into groups which respectively correspond to different operation states and respectively have different priorities. The server further sends an allowance notification indicating a device power supply allowance to apparatuses which belong to respective groups in descending order of priority taking into consideration a parameter associated with power consumption values of apparatuses to which the device power supply allowance is given. Each apparatus sets the device in a power supply ON state when the allowance notification is received from the server.

7 Claims, 20 Drawing Sheets

(56) References Cited

U.S. PATENT DOCUMENTS

| | | | |
|---|---|---|---|
| 2007/0005994 A1* | 1/2007 | Bahali et al. | 713/300 |
| 2008/0178029 A1* | 7/2008 | McGrane et al. | 713/324 |
| 2009/0010671 A1 | 1/2009 | Hashimoto | |
| 2009/0070604 A1* | 3/2009 | Kumakura | 713/310 |
| 2010/0037077 A1* | 2/2010 | Kashyap | 713/330 |
| 2010/0315665 A1* | 12/2010 | Ebisui | 358/1.14 |

FOREIGN PATENT DOCUMENTS

| | | |
|---|---|---|
| JP | 2001-306195 A | 11/2001 |
| JP | 2003-208293 A | 7/2003 |
| JP | 2006-162861 A | 6/2006 |
| JP | 2006-195701 A | 7/2006 |
| JP | 2006-227691 A | 8/2006 |
| JP | 2008-305057 A | 12/2008 |

\* cited by examiner

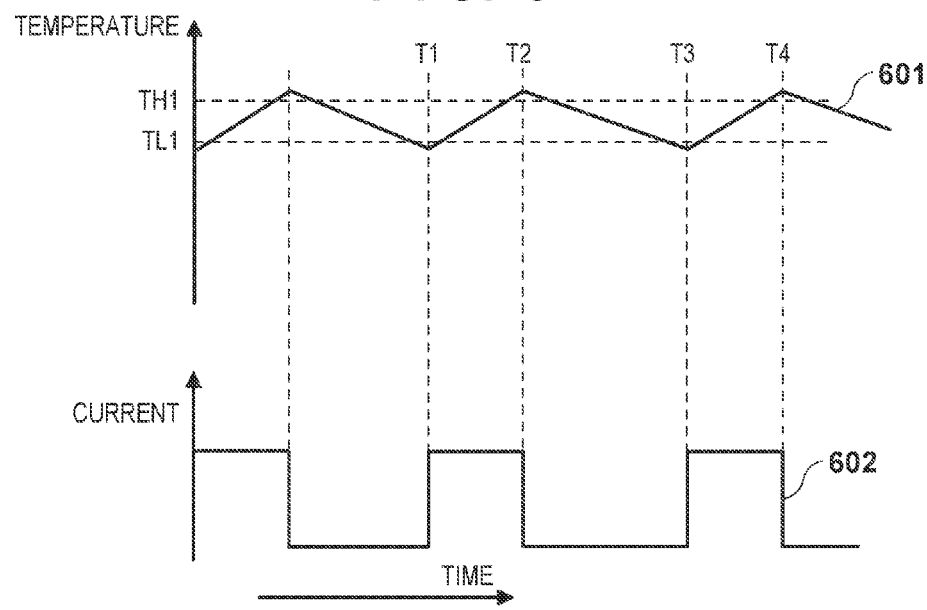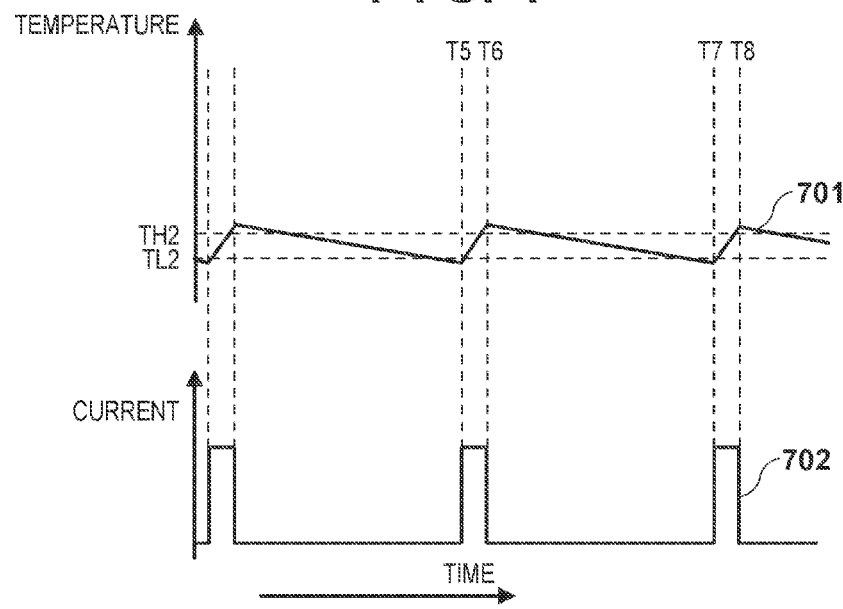

FIG. 12

MANAGEMENT TABLE

| MANAGEMENT NUMBER | ADDRESS | SERIAL NUMBER | MODEL NAME | GROUP | GROUP DURATION | POWER SUPPLY ON ALLOWANCE |
|---|---|---|---|---|---|---|
| #001 | 192.168.1.55 | #400432 | iR5000 | STANDBY | 2009/12/26 18:03 | DISALLOWANCE |
| #002 | 192.168.1.90 | #100123 | iR8500 | POWER SUPPLY OFF | 2009/12/26 18:04 | DISALLOWANCE |
| #003 | 192.168.1.63 | #300664 | iR6000 | HEATING | 2009/12/26 18:06 | ALLOWANCE |
| #004 | 192.168.1.44 | #301233 | iR6000 | PRINTING | 2009/12/26 18:03 | ALLOWANCE |
| #005 | 192.168.1.72 | #414432 | iR5000 | PRINTING | 2009/12/26 18:04 | ALLOWANCE |
| #006 | 192.168.1.33 | #100033 | iR8500 | STANDBY | 2009/12/26 18:05 | DISALLOWANCE |

FIG. 18

MANAGEMENT TABLE

| MANAGEMENT NUMBER | ADDRESS | SERIAL NUMBER | MODEL NAME | GROUP | POWER CONSUMPTION | GROUP DURATION | POWER SUPPLY ON ALLOWANCE |
|---|---|---|---|---|---|---|---|
| #001 | 192.168.1.55 | #400432 | iR5000 | STANDBY | 900W | 2009/12/26 18:03 | DISALLOWANCE |
| #002 | 192.168.1.90 | #100123 | iR8500 | POWER SUPPLY OFF | 1830W | 2009/12/26 18:04 | DISALLOWANCE |
| #003 | 192.168.1.63 | #300664 | iR6000 | HEATING | 1010W | 2009/12/26 18:06 | ALLOWANCE |
| #004 | 192.168.1.44 | #301233 | iR6000 | PRINTING | 1010W | 2009/12/26 18:03 | ALLOWANCE |
| #005 | 192.168.1.72 | #414432 | iR5000 | PRINTING | 900W | 2009/12/26 18:04 | ALLOWANCE |
| #006 | 192.168.1.33 | #100033 | iR8500 | STANDBY | 1830W | 2009/12/26 18:05 | DISALLOWANCE |

F I G. 22

MANAGEMENT TABLE 2201

| MANAGEMENT NUMBER | ADDRESS | SERIAL NUMBER | MODEL NAME | GROUP | POWER CONSUMPTION | GROUP DURATION | POWER SUPPLY ON ALLOWANCE/ DUTY RATIO |
|---|---|---|---|---|---|---|---|
| #001 | 192.168.1.55 | #400432 | iR5000 | STANDBY | 900W | 2009/12/26 18:03 | DISALLOWANCE |
| #002 | 192.168.1.90 | #100123 | iR8500 | POWER SUPPLY OFF | 1830W | 2009/12/26 18:04 | DISALLOWANCE |
| #003 | 192.168.1.63 | #300664 | iR6000 | HEATING | 1010W | 2009/12/26 18:06 | DISALLOWANCE |
| #004 | 192.168.1.44 | #301233 | iR6000 | PRINTING | 1010W | 2009/12/26 18:03 | 80% |
| #005 | 192.168.1.72 | #414432 | iR5000 | PRINTING | 900W | 2009/12/26 18:04 | 80% |
| #006 | 192.168.1.33 | #100033 | iR8500 | STANDBY | 1830W | 2009/12/26 18:05 | DISALLOWANCE |

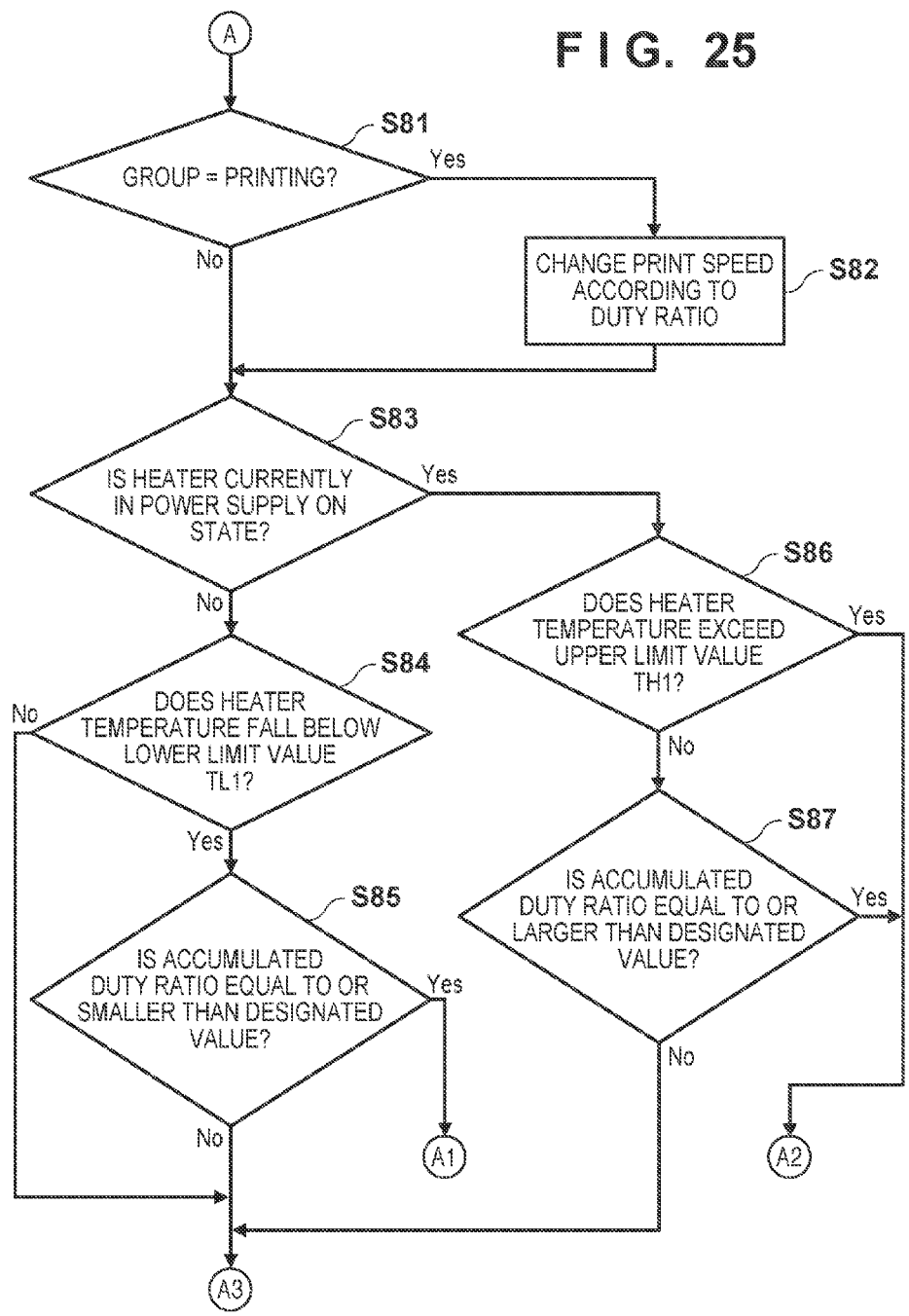

SYSTEM FOR CONTROLLING TOTAL POWER CONSUMPTION OF PLURAL APPARATUSES AND CONTROL METHOD THEREOF

BACKGROUND OF THE INVENTION

1. Field of the Invention

The present invention relates to a system for controlling total power consumption of a plurality of apparatuses, and a control method thereof.

2. Description of the Related Art

There is a need for setting an upper limit of total power consumption of OA equipments which are operating in an office. Especially, such a need has arisen in large-scale offices where there are a large number of electrophotographic image forming apparatuses such as MFPs (Multi Functional Printers), printers, and FAX (facsimile) apparatuses operating. Therefore, there is a need to reduce power consumption, or a limited power supply capability for a power supply equipment.

Conventionally, there is an example in which a total power consumption amount of a large number of apparatuses is estimated, and power supplies of these apparatuses are controlled not to exceed an upper limit value (see Japanese Patent Laid-Open No. 2006-227691). In this example, a server calculates a total power consumption amount of the respective apparatuses, and turns off power supplies of apparatuses with lower operation rates when the upper limit value is exceeded.

On the other hand, an electrophotography image forming apparatus uses a heater to form an image. In order to fix toner powder, which is electrostatically attracted on a print sheet, on the print sheet, the toner is attached to the print sheet under pressure by a high-temperature roller. In order to set the roller to a high temperature, a heater in an MFP consumes an electric power of several hundred to several thousand W (watt). An occupation ratio of power consumption of the heater to that of the overall image forming apparatus is high (for example, 70% to 90%). This ratio depends on the specifications of image forming apparatuses. That is, an apparatus with a higher print speed requires a larger amount of power to be consumed, and the occupation ratio of power consumption of the heater to that of the overall apparatus tends to be higher. Therefore, in an environment in which heaters of a plurality of image forming apparatuses are operating at the same time, a total power consumption amount may assume a large value.

In the heater control, the power supply ON/OFF state of the heater is controlled so as to maintain a target temperature, which is set in advance. As the simplest example of the control method, when the value of a temperature sensor exceeds a given value, the heater is set in a power supply OFF state; when it falls below the given value, the heater is set in a power supply ON state. In a typical MFP, a switching cycle between the power supply ON and OFF states is on the order of several sec to several ten sec, and the MFP consumes an electric power only in the power supply ON state. An average power consumption amount per cycle can be defined by (a power consumption amount in the heater power supply ON state)×(a duty ratio of a current to be supplied to the heater). This duty ratio is a ratio of a power supply ON time period to one switching cycle between the power supply ON and OFF states of the heater. Note that a required electric power tends to be higher as the apparatus requires a higher print speed. This is because the apparatus with a high print speed has a high conveyance speed of a print sheet, and a heat application time period when the heater applies heat to the print sheet to fix an image is short. The required electric power also varies depending on the thickness of a print sheet. Since a heat absorption amount increases with increasing thickness of a print sheet, the required electric power increases.

The duty ratio which decides the average power consumption amount of the MFP depends on the target temperature and current temperature of the heater. Furthermore, the target temperature varies depending on job execution states. Control states of the MFP are classified into, for example, the following four states: a "power supply OFF" state in which the electric power to be supplied to the heater is completely cut off; a "standby" state in which the power supply ON/OFF state of the heater is controlled so that the heater falls within a given temperature range; a "heating" state in which the heater is set in a normally power supply ON state; and a "printing" state of job data.

In a printing apparatus in which the heater control state changes like the aforementioned four states, when the power supply ON/OFF state of the heater is uniquely controlled like in Japanese Patent Laid-Open No. 2006-227691, a long waiting time period from when the user inputs a print instruction until a print operation is started is often required. The above literature does not consider any change in power consumption of the apparatus depending on the apparatus state. For this reason, although the total power consumption amount exceeds a power supply capability in an office, the number of apparatuses in a power supply ON state increases in some cases.

SUMMARY OF THE INVENTION

The present invention has been made in consideration of the aforementioned problems, and provides a technique which can prevent usability drops of respective apparatuses due to a limitation of a total power consumption amount as much as possible, while setting an upper limit to the total power consumption amount of a plurality of apparatuses in a system which includes a server and the plurality of apparatuses each incorporating a device.

According to one aspect of the present invention, there is provided a system which comprises a server and a plurality of apparatuses each incorporating a device, and in which the plurality of apparatuses control power supply ON and OFF states of the devices in accordance with an instruction from the server, the server comprising: a collecting unit that collects pieces of operation state information indicating operation states of the plurality of apparatuses from the plurality of apparatuses; a grouping unit that groups, with reference to the pieces of operation state information collected by the collecting unit, the plurality of apparatuses into groups which respectively correspond to a plurality of different operation states and respectively have different priorities as priorities used when the server gives a device power supply allowance; and a notification unit that sends an allowance notification indicating a device power supply allowance to apparatuses which belong to respective groups in descending order of priority within a range in which a parameter associated with power consumption values of apparatuses to which the device power supply allowance is given of the plurality of apparatuses does not exceed an upper limit value which is predetermined in correspondence with a total power consumption amount of the plurality of apparatuses, and each of the plurality of apparatuses comprising: a control unit that sets the device in a power supply ON state when the allowance notification is received from the server, and sets the device in a power supply OFF state when the allowance notification is not received from the server.

According to another aspect of the present invention, there is provided a control method of a system which comprises a server and a plurality of apparatuses each incorporating a device, and in which the plurality of apparatuses control power supply ON and OFF states of the devices in accordance with an instruction from the server, the method comprising: in the server, collecting pieces of operation state information indicating operation states of the plurality of apparatuses from the plurality of apparatuses; grouping, with reference to the pieces of operation state information collected in the collecting, the plurality of apparatuses into groups which respectively correspond to a plurality of different operation states and respectively have different priorities as priorities used when the server gives a device power supply allowance; sending an allowance notification indicating a device power supply allowance to apparatuses which belong to respective groups in descending order of priority within a range in which a parameter associated with power consumption values of apparatuses to which the device power supply allowance is given of the plurality of apparatuses does not exceed an upper limit value which is predetermined in correspondence with a total power consumption amount of the plurality of apparatuses; and in each of the plurality of apparatuses, setting the device in a power supply ON state when the allowance notification is received from the server, and setting the device in a power supply OFF state when the allowance notification is not received from the server.

According to still another aspect of the present invention, there is provided a system comprising: a collecting unit that collects pieces of operation state information indicating operation states of a plurality of apparatuses from the plurality of apparatuses; a management unit that manages priority based on the pieces of operation state information collected by the collecting unit; and a control unit that allows, when a total power consumption amount of the plurality of apparatuses exceeds an upper limit value, power supply to the plurality of apparatus in accordance with the priority managed by the management unit.

According to the present invention, in the system which includes the server and the plurality of apparatuses each incorporating the device, usability drops of respective apparatuses due to a limitation of a total power consumption amount can be prevented as much as possible while setting an upper limit to the total power consumption amount of the plurality of apparatuses.

Further features of the present invention will become apparent from the following description of exemplary embodiments (with reference to the attached drawings).

BRIEF DESCRIPTION OF THE DRAWINGS

FIG. 6 is a graph showing the waveforms of the temperature of the heater 207 and the current flowing through the heater 207 with respect to a time;

FIG. 7 is a graph showing the waveforms of the temperature of the heater 207 and the current flowing through the heater 207 when a low target temperature of the heater 207 is set with respect to a time;

FIG. 12 shows an example of a management table 1201 incorporated in a server 100;

FIG. 18 shows an example of a management table 1801;

FIG. 22 shows an example of a management table 2201;

FIG. 25 is a flowchart showing the sequence of the heater control task processing of the MFP.

DESCRIPTION OF THE EMBODIMENTS

Embodiments of the present invention will be described in detail hereinafter with reference to the drawings. Note that the following embodiments do not limit the scope of the claims, and all of combinations of characteristic features described in embodiments are not always essential to solving means of the invention.

First Embodiment

In the first embodiment, a server groups a plurality of apparatuses to be managed by the server into groups having different priorities required when the server gives a power supply allowance to heaters included in the respective apparatuses in accordance with operation states of the apparatuses. Furthermore, the server gives a power supply allowance to heaters of apparatuses which belong to respective groups within a range in which the number of apparatuses, which can get a heater power supply ON allowance, does not exceed an upper limit value, which is determined in advance in correspondence with a total power consumption value of the plurality of apparatuses. More specifically, the server gives a heater power supply ON allowance to apparatuses which belong to the respective groups in descending order of priority within a range in which the number of apparatuses, which get the heater power supply allowance, does not exceed the upper limit value. For a group in which the number of apparatuses, which get the allowance, exceeds the upper limit value during the heater power supply allowance process, the server gives a heater power supply ON allowance to only some apparatuses which belong to that group according to priorities in the group so as not to exceed the upper limit value.

<System Configuration>

[Overall Configuration (FIG. 1)]

Figure 1:
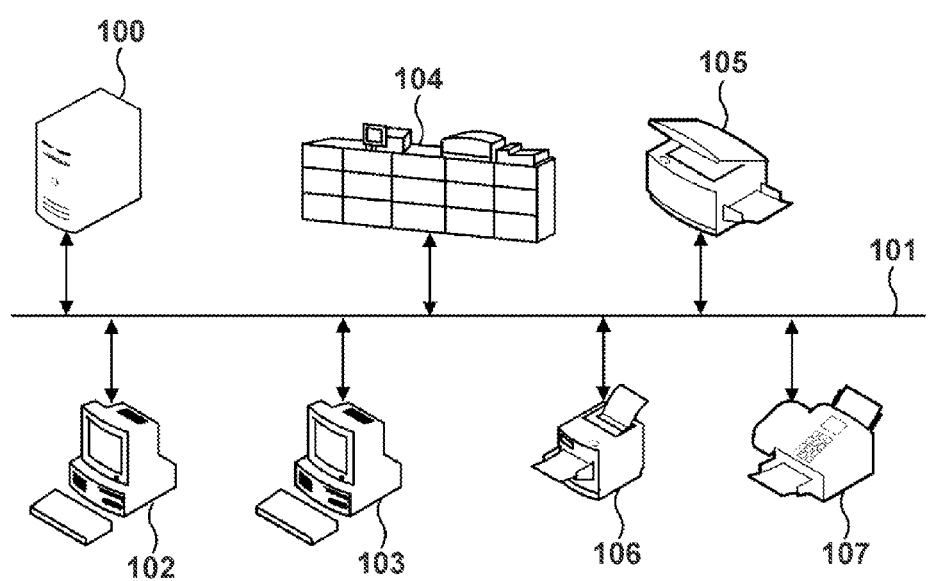
FIG. 1 is a view showing the overall configuration of a system according to the first embodiment of the present invention.

FIG. 1 shows the configuration of a system. A server 100 is connected to a network 101, and executes power supply control of devices (for example, heaters) incorporated in MFPs 104 and 105, a printer 106, and a FAX 107. PCs 102 and 103 are those which are used by users, and can exchange data with the apparatuses such as the MFPs 104 and 105, printer 106, and FAX 107. The MFPs 104 and 105 are devices, each of which integrates copy, FAX, printer, and scanner functions. The apparatuses 104 to 107 have variations in color compatibilities, print speeds, and the like, and require largely different power consumption amounts. Especially, an apparatus which includes a printer which thermally fixes toner requires a larger electric power for its heater. A color printer requires a larger power consumption amount than a monochrome printer, and a power consumption amount becomes larger with increasing print speed. The MFP 104 is an example of a large-sized floor model, and the MFP 105 is an example of a compact desktop model. The printer 106 and FAX 107 are single-function devices. The present invention can be applied to such various apparatuses. However, for the sake of simplicity, the MFP 104 which requires a large power consumption amount will be used as a representative device in the following description.

[Internal Arrangement of MFP (FIG. 2)]

Figure 2:
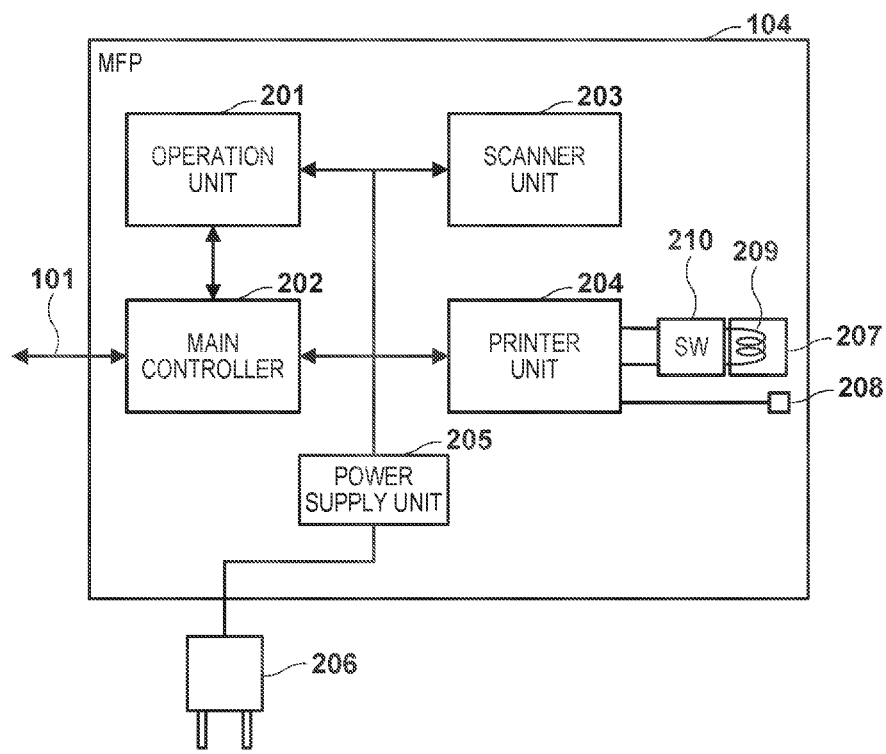
FIG. 2 is a block diagram showing the internal arrangement of an MFP 104.

FIG. 2 is a block diagram showing the internal arrangement of the MFP 104. A main controller 202 controls the operations of the MFP 104, and executes, for example, data exchange processing, data conversion processing, data saving processing, and power control.

When the MFP 104 executes a print function, the PC 102 or 103 generates job data. The generated job data is transferred to the main controller 202 via the network 101, and is temporarily saved in the main controller 202. The main controller 202 converts the saved job data into image data, and transfers the image data to a printer unit 204. The printer unit 204 prints image data on a print sheet and discharges the print sheet outside the apparatus under the control of the main controller 202. The printer unit 204 includes a heater 207 required to fix a toner on a print sheet at a high temperature. The printer unit 204 executes temperature control of the heater 207 based on a temperature of the heater 207 measured by a temperature sensor 208 under the control of the main controller 202. The temperature control is attained by repetitively setting the heater 207 in power supply ON and OFF states by a switch 210. The printer unit 204 switches the switch 209 by changing a signal level on a switch control line (not shown).

When the MFP 104 executes a scan function, the user sets a document on a scanner unit 203, and then operates buttons while referring to a screen of an operation unit 201. Then, the user sets a scan operation, and then instructs to start the scan operation. The scanner unit 203 optically scans the document and converts an image of the document into image data under the control of the main controller 202. The image data is temporarily saved in the main controller 202. After that, the main controller 202 converts a data format of the saved image data if required, and transfers the image data to a destination designated in advance on the operation unit 201.

When the MFP 104 executes a copy function, the user sets a document on the scanner unit 203, and then operates buttons while referring to the screen of the operation unit 201. Then, the user sets a copy operation, and then instructs to start the copy operation. The scanner unit 203 optically scans the document and converts an image of the document into image data under the control of the main controller 202. The image data is temporarily saved in the main controller 202. After that, the main controller 202 converts a data format of the saved image data, and transfers the converted image data to the printer unit 204. The printer unit 204 prints the transferred image data on a print sheet, and discharges the printed print sheet outside the apparatus. A power supply unit 205 is a power supply which converts a commercial power supply supplied from a power supply plug 206 into voltages used in the respective units of the MFP 104, and supplies the converted voltages to the respective units.

[Detailed Arrangement of Main Controller 202 (FIG. 3)]

Figure 3:
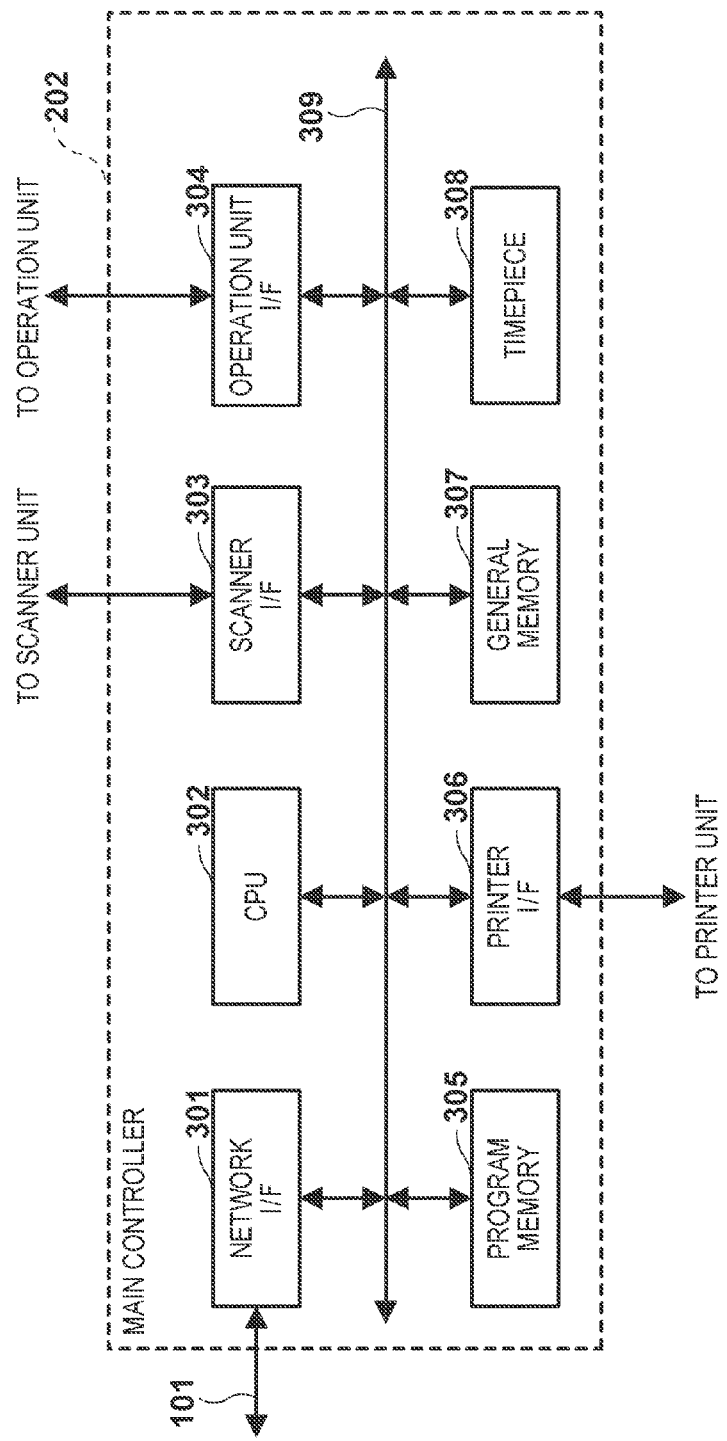
FIG. 3 is a block diagram showing the arrangement of a main controller 202 of the MFP 104.

FIG. 3 is a block diagram showing the arrangement of the main controller 202 of the MFP 104. A CPU 302, which controls the main controller 202, executes programs read out from a program memory 305 as a nonvolatile memory, and executes processing using a general memory 307 as a temporary storage area. In the main controller 202, a network I/F 301 used to make network communications, a scanner I/F 303 used to make communications with the scanner unit 203, a printer I/F 306 used to make communications with the printer unit 204, and a timepiece 308 are connected via an internal bus 309. The timepiece 308 is periodically corrected by an NTP (Network Time Protocol) method via the network so as to maintain its precision.

[Temperature Characteristics of Heater 207 (FIGS. 4 and 5)]

Figure 4:
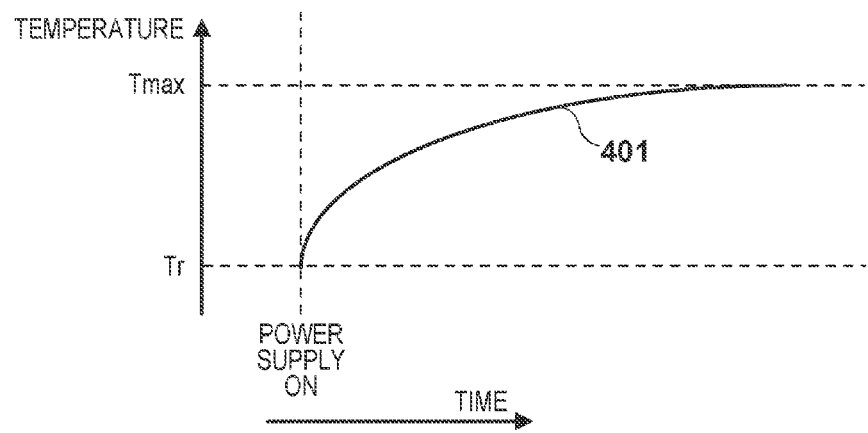
FIG. 4 is a graph showing a change in temperature after a heater 207 is set in a power supply ON state when it is at a room temperature.

The temperature-time characteristics of the heater 207 will be described below. FIG. 4 is a graph showing a temperature change after the heater 207 is set in a power supply ON state when it is at a room temperature. In this example, a constant voltage is applied to the heater 207. In a waveform 401, the temperature rises abruptly from a room temperature Tr, and a slope becomes smaller as the temperature comes closer to a maximum temperature Tmax.

Figure 5:
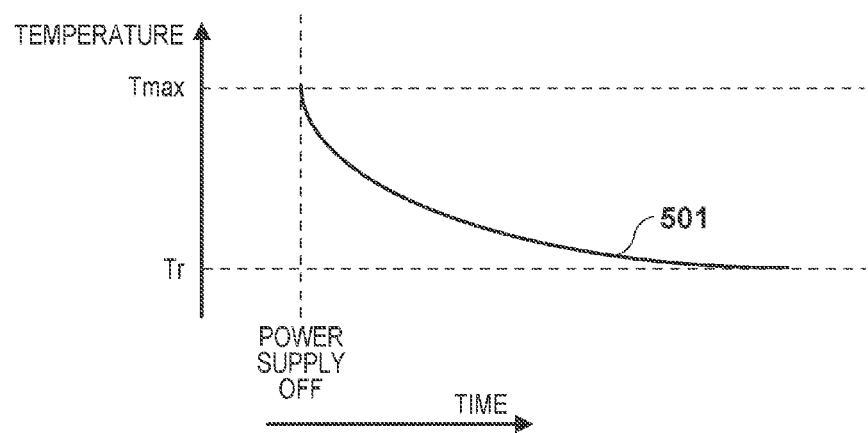
FIG. 5 is a graph showing a change in temperature after the heater 207 is set in a power supply OFF state when it is at a maximum temperature.

FIG. 5 is a graph showing a temperature change after the heater 207 is set in a power supply OFF state when it is at the maximum temperature. This graph shows a case in which the heater 207 is in a power supply ON state for a long period of time, and is set in a power supply OFF state when the temperature nearly reaches Tmax. In a waveform 501, the temperature initially abruptly drops, but a slope gradually becomes smaller as the temperature comes closer to the room temperature. The MFP 104 executes control to keep the temperature of the heater 207 to fall within a given temperature range. As the given temperature range becomes higher, more electric power is required. This is because the heater 207 has characteristics in which it is not easily warmed up but it is easily cooled down as it has higher temperature.

[Temperature Characteristics and Current Characteristics of Heater 207 (FIGS. 6 and 7)]

FIG. 6 is a graph showing the waveforms of the temperature of the heater 207 and the current which flows through the heater 207 with respect to a time. The abscissa plots a time. Reference numeral 601 denotes a temperature of the heater 207 sensed by the temperature sensor 208; and 602, a current which flows through the heater 207. Reference symbol TH1 denotes an upper limit threshold of the temperature range of the heater 207; and TL1, a lower limit threshold of that range. Since the temperature falls below TL1 at times T1 and T3, the heater is set in a power supply ON state. Since the temperature exceeds TH1 at times T2 and T4, the heater 207 is set in a power supply OFF state. Thus, the heater 207 can maintain the given temperature range. A cycle between the power supply ON and OFF states of the heater 207, and a current value of the current to be supplied to the heater 207 are not constant, and change depending on a target temperature, external temperature, and the presence/absence of a fed print sheet. Also, the characteristics of the heater 207 largely vary depending on models of the apparatuses.

FIG. 7 is a graph showing the waveforms of the temperature of the heater 207 and the current which flows through the heater 207 when a low target temperature of the heater 207 is set with respect to a time. The abscissa plots a time. Reference numeral 701 denotes a temperature of the heater 207 sensed by the temperature sensor 208; and 702, a current which flows through the heater 207. Reference symbol TH2 denotes an upper limit threshold of the temperature range of the heater 207; and TL2, a lower limit threshold of the range. TH2 and TL2 are lower than TH1 and TL1 in FIG. 6, and are set at temperatures close to the room temperature. According to the characteristics of the heater 207, when the heater 207 is at a low temperature, a temperature rising ratio in a power supply ON state of the heater 207 is high, and a temperature falling ratio in the power supply OFF state is low. For this reason, the temperature of the heater 207 reaches TH2 within a short period of time from a time T5 at which the heater 207 is set in a power supply ON state until a time T6 at which the heater 207 is set in a power supply OFF state. Since the temperature falling ratio is low, a time period from when the heater 207 is set in a power supply OFF state at the time T6 until a time T7 at which the temperature falls below TL2 and the heater 207 is set in a power supply ON state is prolonged. That is, according to FIGS. 6 and 7, by lowering the target temperature, a duty ratio of a current to be supplied to the heater 207 lowers. As a result, an effect of reducing an average power consumption amount per cycle of the current to be supplied to the heater 207 can be expected.

[Transition of Groups (FIG. 8)]

Figure 8:
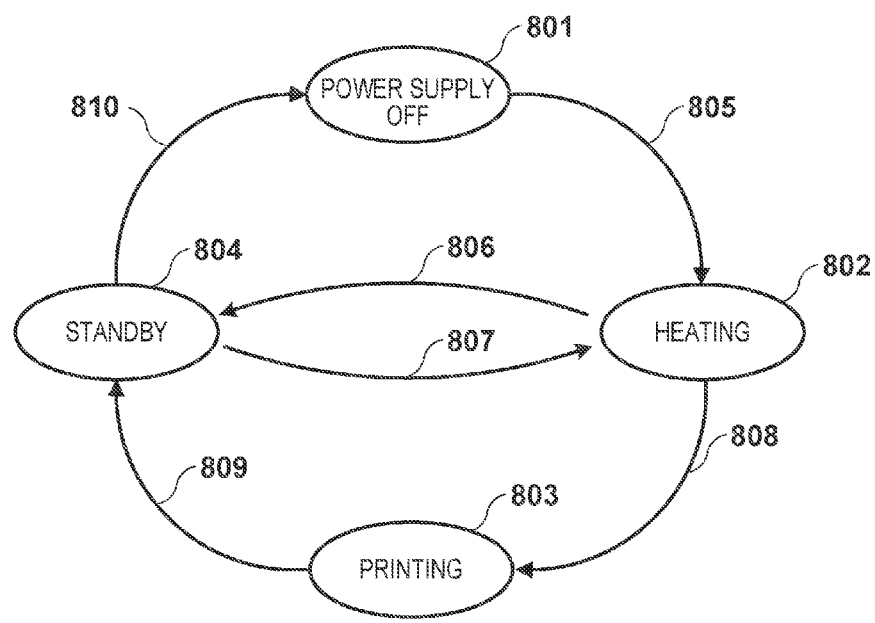
FIG. 8 is a view showing group transitions as a result of the operations of the MFP 104 and state changes of the heater 207.

FIG. 8 is a transition view of groups as a result of the operations of the MFP 104 and state changes of the heater. The operation state of the MFP 104 transits among four states, that is, "printing" 803, "heating" 802 (heated state), "standby" 804 (standby state), and "power supply OFF" 801, as described above. In this embodiment, these operation states respectively correspond to groups to which the MFP 104 belongs. The MFP 104 belongs to one of these groups according to its operation state, and the group to which the MFP 104 belongs transits in correspondence with a state change of the heater 207 and a status of use of the user.

The aforementioned four groups corresponding to the four operation states of the MFP 104 will be respectively described below.

(1) "Power supply OFF" 801: In this state, an electric power to be supplied to the heater is completely cut off. When a non-execution state of processing of a job to be printed continues for a long period of time, the heater 207 is set in a power supply OFF state to attain power savings. Even when the MFP 104 belongs to the "power supply OFF" group 801, it may process a job other than a print job, or it may wait until generation of a job. Normally, in the power supply OFF state, the temperature of the heater 207 is likely to be lowered to the room temperature, and a power consumption amount of the heater 207 in this state is zero. On the other hand, in this state, a time period required until the heater 207 can reach a print start temperature when a print job is generated becomes longest. That is, the user waits for a longest period of time until a print sheet is discharged from the apparatus.

(2) "Standby" 804: In this state, the power supply ON/OFF state of the heater 207 is controlled so that the temperature of the heater 207 falls within the given temperature range corresponding to the target temperature. Normally, the target temperature of the heater 207 in the MFP 104, which belongs to the "standby" group 804, is set to assume a value lower than the target temperature at the time of printing, so as to save a power consumption amount. The power consumption amount of the heater 207 increases/decreases according to the target temperature. As the target temperature is higher, a wait time period until a print job is started is shortened, while the power consumption amount of the heater 207 increases.

(3) "Heating" 802: In this state, the heater 207 is set in a normally power supply ON state. After power-ON in a state in which the heater 207 is cooled down to the room temperature or when the heater 207 is required to be quickly heated to a print temperature upon generation of a print job, the MFP 104 belongs to this group. When a difference between the target temperature and the temperature of the heater 207 is large, the heater 207 is set in a normally power supply ON state. The heater 207 in this state requires a maximum power consumption amount.

(4) "Printing" 803: In this state, print processing of job data is in progress, and a print sheet passes through a fixing unit including a roller heated by the heater 207. When one job includes a plurality of pages, print sheets successively pass through the fixing unit at given intervals. In this state, when a print sheet contacts the roller, since heat of the roller is absorbed by the print sheet, the temperature of the heater 207 often decreases via the roller. Normally, the target temperature in print processing is higher than that in the standby state, thus maximizing the power consumption amount.

In a power-OFF state, the MFP 104 belongs to the "power supply OFF" group 801. After power-ON, the MFP 104 transits to the "heating" group 802 since the temperature of the heater 207 is lower than the target temperature in the standby state (805). However, when the heater 207 is heated, and the temperature of the heater 207 rises to that near the target temperature in the standby state, the MFP 104 transits to the "standby" group 804 in which the heater 207 is repetitively set in the power supply ON and OFF states to maintain a given temperature (806). After that, when the user enters a print job to the MFP 104, the MFP 104 is required to quickly raise the temperature of the heater 207 to the target temperature in print processing, and transits to the "heating" group 802 (807). After the temperature of the heater 207 has reached the target temperature in print processing, the MFP 104 transits to the "printing" group 803 in which print processing is executed on a print sheet (808). After print processing of all pages is complete, the MFP 104 transits to the "standby" group 804 again (809). After an elapse of a predetermined period of time or more since the MFP 104 belongs to the "standby" group 804, the MFP 104 transits to the "power supply OFF" group 801 so as to save power consumption of the heater 207 (810). When processing of a job such as a print job or copy job which requires a print operation is to be started while the MFP 104 belongs to the "power supply OFF" group 801, the MFP 104 transits to the "heating" group 802 (805).

It is important for this embodiment to give a power supply ON allowance of the heater 207 in turn from MFPs which belong to groups having higher priorities. The "printing" group 803 has a highest priority. As the first reason, when an electric power is not supplied to the heater 207 of an MFP which belongs to the "printing" group 803, completion of a print job is delayed, and the user who waits for completion of that job is kept waited. As the second reason, since the target temperature of the heater 207 is highest, the print job has to be completed within a short period of time so as to attain power savings. As the third reason, when the print operation of a print job including a plurality of pages is interrupted, a state in which only printed print sheets are discharged is continued. In this case, although all print sheets are not discharged, the user is likely to take away only the discharged print sheets.

The "heating" group 802 has the second highest priority next to the "printing" group 803. This is because when an electric power is not supplied to the heater 207 of an MFP which belongs to the "heating" group 802, completion of a print job is delayed, and the user who waits for completion of that job is kept waited. On the other hand, in the MFP which belongs to the "heating" group 802, since the heater 207 is in a normally power supply ON state, the job has to be completed within a short period of time so as to attain power savings. The "standby" group 804 has the third highest priority next to the "heating" group 802, and the "power supply OFF" group 801 has the lowest priority.

[Example of Heater Power Supply ON Allowance Result (FIGS. 9 to 11)]

Figure 9:
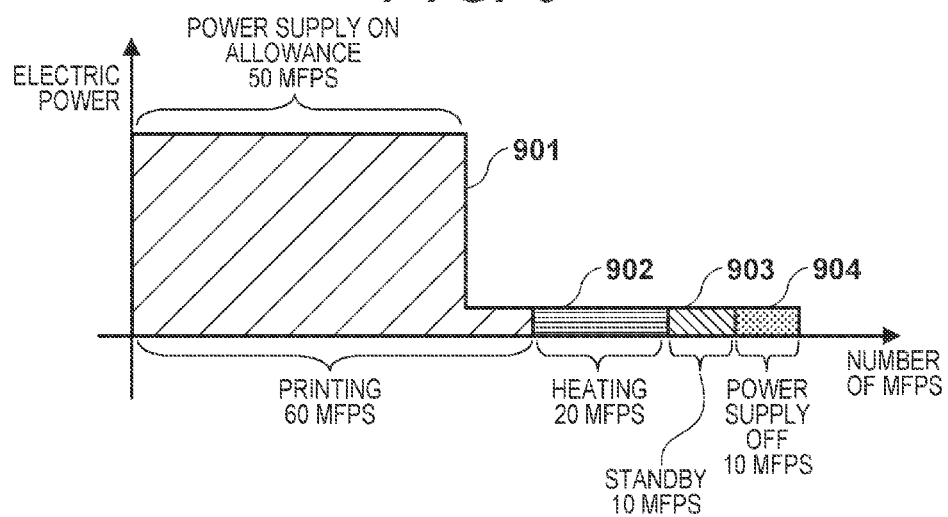
FIG. 9 is a graph showing the determination result of a server when the number of MFPs in a "printing" group 803 exceeds an upper limit value.
Figure 10:
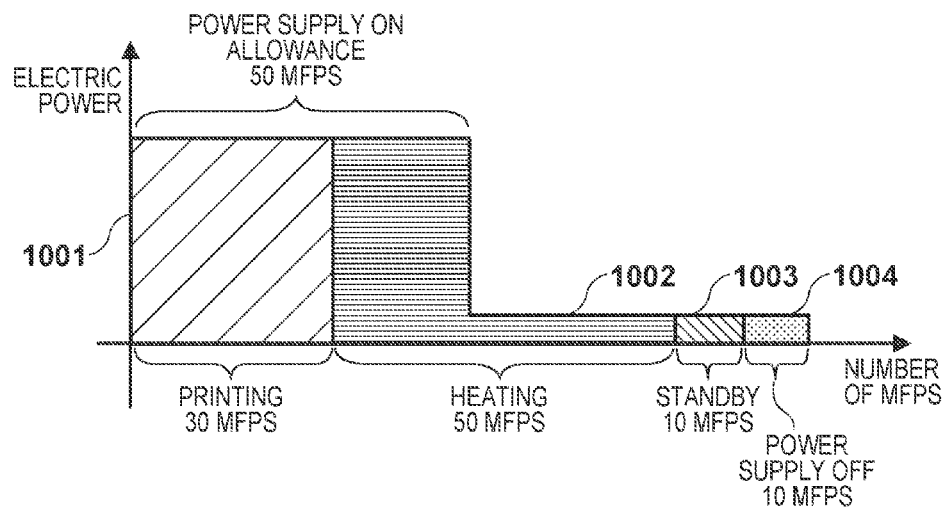
FIG. 10 is a graph showing the determination result of the server when the sum of the numbers of MFPs in the "printing" group 803 and a "heating" group 802 exceeds the upper limit value.
Figure 11:
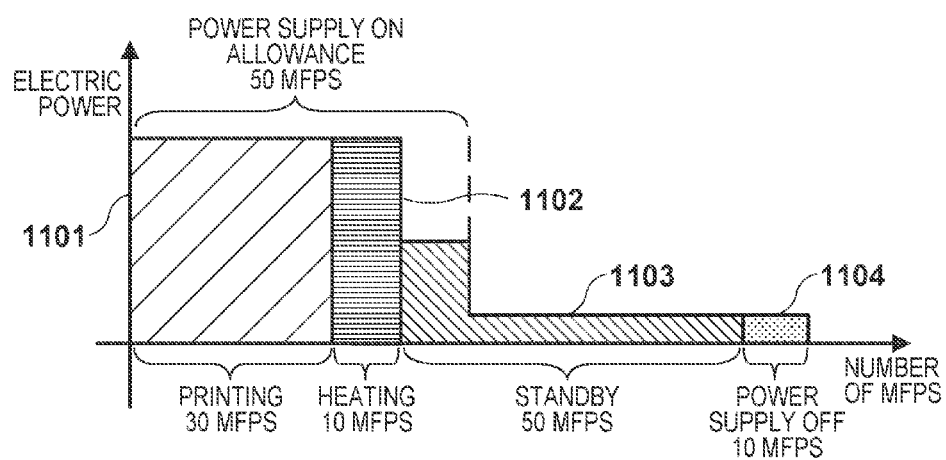
FIG. 11 is a graph showing the determination result of the server when the sum of the numbers of MFPs in the "printing" group 803, the "heating" group 802, and a "standby" group 804 exceeds the upper limit value.

As shown in FIGS. 9 to 11, three typical examples of the control of the heaters 207 of respective MFPs by the server 100 of this embodiment will be described below. In this embodiment, the server 100 manages 100 MFPs, and gives a power supply ON allowance to the heaters 207 of 50 MFPs. That is, the upper limit value of the number of MFPs, which can get a power supply ON allowance of the heaters 207 from the server 100, is 50. In this embodiment, the 100 MFPs are grouped into the four groups, that is, "printing" 803, "heating" 802, "standby" 804, and "power supply OFF" 801 in descending order of priority according to their operation states.

FIG. 9 shows the determination result of the server when the number of MFPs which belong to the "printing" group 803 exceeds the upper limit value. At an instance shown in FIG. 9, 60 MFPs belong to the "printing" group 803, 20 MFPs belong to the "heating" group 802, 10 MFPs belong to the "standby" group 804, and 10 MFPs belong to the "power supply OFF" group 801. The "printing" group 803 to which 60 MFPs belong has the highest priority, and the number of MFPs which belong to this group exceeds 50 as the upper limit value. Therefore, the server 100 gives a power supply ON allowance of the heater 207 to only 50 MFPs which belong to the "printing" group 803 of the 100 MFPs to be managed, and does not give any power supply ON allowance of the heater to the remaining 50 MFPs. In this case, in FIG. 9, the power consumption values of the MFPs 104 which cannot get any power supply ON allowance of the heaters 207 are those of devices other than the heaters 207, and an electric power is very low.

In each of 10 MFPs 104 which cannot get any power supply allowance of the heaters 207 of those which belong to the "printing" group 803, the temperature of the heater 207 lowers along with an elapse of a time. At this time, each of these heaters 207 is in a power supply OFF state, and print processing is interrupted. However, in consideration of usability of users, the print processing should be restarted as soon as possible. Therefore, these MFPs have a higher priority than those which belong to other groups. For this reason, in this embodiment, the server 100 maintains the group of the MFPs 104 whose print processing is interrupted of those which belong to the "printing" group 803 without changing it to another group according to their operation states. Of course, the server 100 may transit the MFPs 104 whose print processing is interrupted from the "printing" group 803 to the "power supply OFF" group 801 based on the state of their heaters 207. Alternatively, five groups may be set, and a "print interrupted" group may be added.

FIG. 10 shows the determination result of the server when the sum of the numbers of MFPs which belong to the "printing" group 803 and "heating" group 802 exceeds the upper limit value. At an instance shown in FIG. 10, 30 MFPs belong to the "printing" group 803, 50 MFPs belong to the "heating" group 802, 10 MFPs belong to the "standby" group 804, and 10 MFPs belong to the "power supply OFF" group 801. The number of MFPs which belong to the "printing" group 803 having the highest priority is 30, which is equal to or smaller than 50 as the upper limit value. For this reason, the server 100 gives a power supply ON allowance of the heaters 207 to all the MFPs 104 which belong to this group. The number of MFPs which belong to the "heating" group 802 having the second highest priority is 50. This value is added to 30 as the number of MFPs which belong to the "printing" group 803 to yield 80, which exceed 50 as the upper limit value by 30. Therefore, the server 100 gives a heater power supply ON allowance to 20 out of the 50 MFPs which belong to the "heating" group 802, and does not give any allowance to the remaining 30 MFPs. The server 100 does not give any heater power supply ON allowance to the "standby" group 804.

FIG. 11 shows the determination result of the server when the sum of the numbers of MFPs which belong to the "printing" group 803, "heating" group 802, and "standby" group 804 exceeds the upper limit value. At an instance shown in FIG. 11, 30 MFPs belong to the "printing" group 803, 10 MFPs belong to the "heating" group 802, 50 MFPs belong to the "standby" group 804, and 10 MFPs belong to the "power supply OFF" group 801. The number of MFPs which belong to the "printing" group 803 having the highest priority is 30, which is equal to or smaller than 50 as the upper limit value. Hence, the server gives a power supply ON allowance of the heaters 207 to all the MFPs 104 which belong to this group. The number of MFPs which belong to the "heating" group 802 having the second highest priority is 10, and even when this value is added to 30 as the number of MFPs which belong to the "printing" group 803, the sum is equal to or smaller than 50 as the upper limit value. For this reason, the server 100 also gives a heater power supply ON allowance to the 10 MFPs which belong to the "heating" group 802. The number of MFPs which belong to the "standby" group 804 having the third highest priority is 50. This value is added to 30 as the number of MFPs which belong to the "printing" group 803 and 10 as the number of MFPs which belong to the "heating" group 802 to yield 90, which exceed 50 as the upper limit value by 40. Therefore, the server 100 gives a heater power supply ON allowance to 10 out of the 50 MFPs which belong to the "standby" group 804, and does not give any allowance to the remaining 40 MFPs.

[Example of Management Table (FIG. 12)]

FIG. 12 shows an example of a management table 1201 incorporated in the server 100 in the first embodiment. In the server 100, a determination task and communication task are running parallely. The communication task communicates with respective MFPs to acquire pieces of information associated with apparatuses (apparatus information) and pieces of information associated with operation states (operation state information) of the respective MFPs, and stores the pieces of acquired information in the management table 1201. The determination task periodically determines a power supply ON allowance/disallowance of the heaters 207 of the respective MFPs using the apparatus information and operation state information stored in the management table 1201. The determination results of the determination task are saved in the management table 1201. The server 100 informs the respective MFPs of the determination results of the determination task.

In FIG. 12, a management number 1202 is a number used to discriminate an MFP to be managed by the server 100. When a new MFP is found, a new management number is added to the management table 1201. The apparatus information of an MFP of which the MFP notifies the server 100 includes an address 1203, serial number 1204, and model name 1205. The address 1203 is an IP address used in Ethernet®. The serial number 1204 is a fixed number which is assigned to an MFP at the time of manufacture of the MFP and is unique to that apparatus. The model name 1205 is that of an MFP. The server 100 uses the serial number 1204 and model name 1205 so as to specify each MFP. The address 1203 is often changed by the user. When the address of the MFP has been changed, the server 100 updates the address 1203 in the management table 1201.

The operation state information of an MFP of which the MFP notifies the server 100 includes a group 1206 and a group duration 1207. The group 1206 is information indicating to which of the "power supply OFF" group 801, "standby" group 804, "heating" group 802, and "printing" group 803 an MFP belongs. The group duration 1207 is information indicating a time period elapsed since an MFP transits to a group to which it currently belongs. The group duration 1207 is used in determination when a power supply ON allowance of the heater 207 is given to some of MFPs which belong to the single group. In this embodiment, the server 100 preferentially gives a power supply allowance of the heater 207 to MFPs having longer group durations 1207. A power supply ON allowance 1208 of the heater 207 is a flag indicating a power supply ON allowance/disallowance of the heater 207 of each MFP, which is decided by the determination task of the server 100. The server 100 holds this flag in the management table 1201 together with the apparatus information and operation state information of each MFP.

<Processing Sequence of Server>

The processing of the server 100 according to the first embodiment will be described below with reference to FIGS. 13 and 14. In the server 100, the communication task (FIG. 13) and determination task (FIG. 14) are running parallelly. These processes are implemented when a CPU included in the server 100 expands programs stored in, for example, an HDD onto a RAM, and executes the expanded programs.

[Communication Task Processing Sequence (FIG. 13)]

Figure 13:
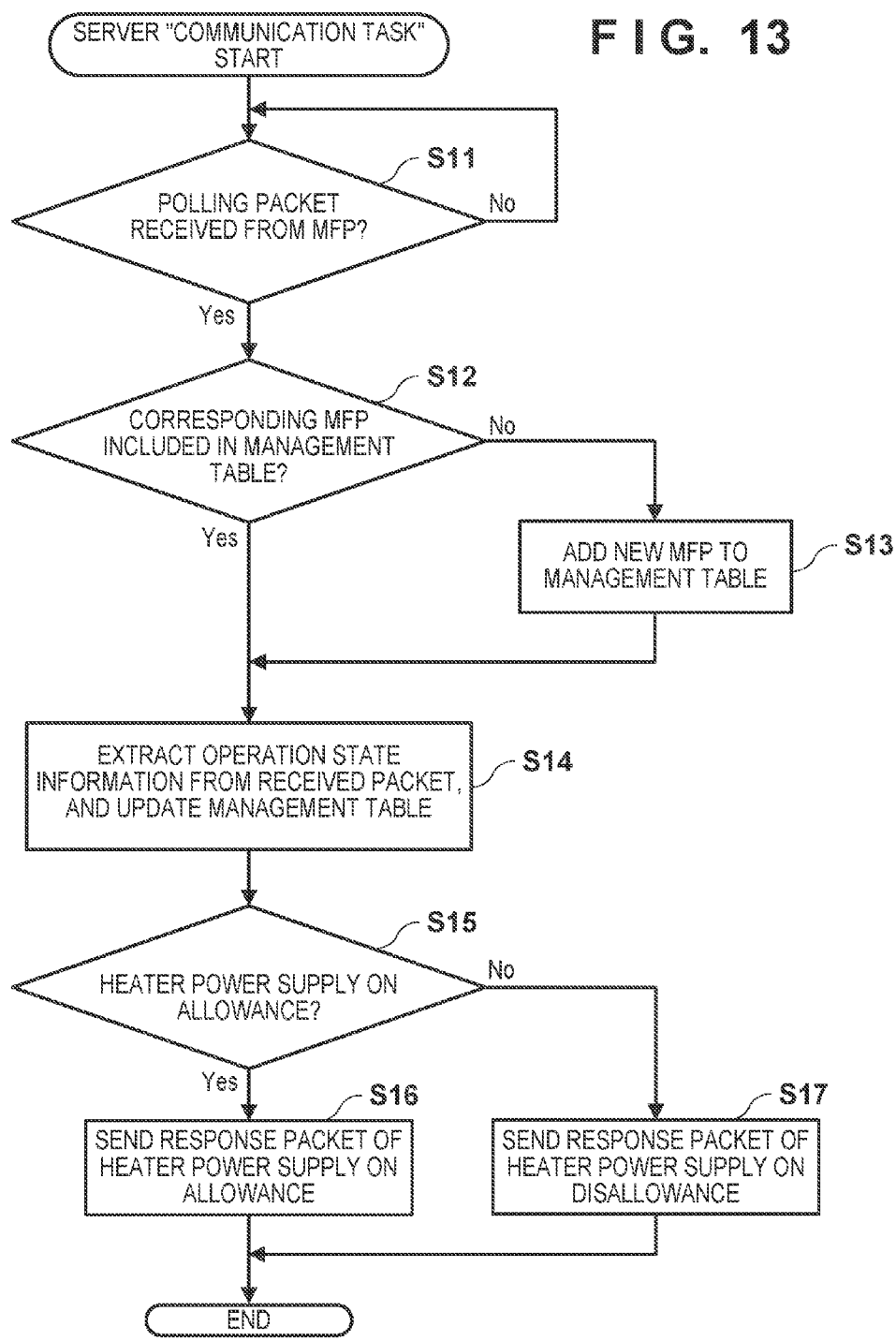
FIG. 13 is a flowchart showing the sequence of communication task processing of the server 100.

FIG. 13 is a flowchart showing the sequence of the communication task processing of the server 100 according to the first embodiment. In step S11, the control waits until a collecting unit (CPU) receives a polling packet from each MFP. The polling packet is a packet which is periodically sent from each MFP to the server 100. The polling packet includes, as the apparatus information and operation state information, the address 1203, serial number 1204, model name 1205, group 1206, and group duration 1207 of each MFP.

Upon reception of the polling packet, the CPU of the server 100 determines in step S12 with reference to the serial number 1204 and model name 1205 in the management table 1201 whether or not an MFP as a source of the polling packet is a new MFP. If the source MFP is a new MFP, the CPU adds information of that MFP to the management table 1201, and assigns a new management number 1202 to the MFP in step S13.

In step S14, the CPU extracts the operation state information from the received packet, and updates the management table 1201. More specifically, the CPU updates the group 1206 and group duration 1207. The CPU refers to the column of the power supply ON allowance 1208 of the heater 207 in the management table 1201 in step S15. If an allowance is set, the CPU sends a packet indicating a power supply ON allowance of the heater 207 as a response to the polling packet to that MFP in step S16. If a disallowance is set in step S15, the CPU sends a disallowance packet to that MFP in step S17.

[Determination Task Processing Sequence (FIG. 14)]

Figure 14:
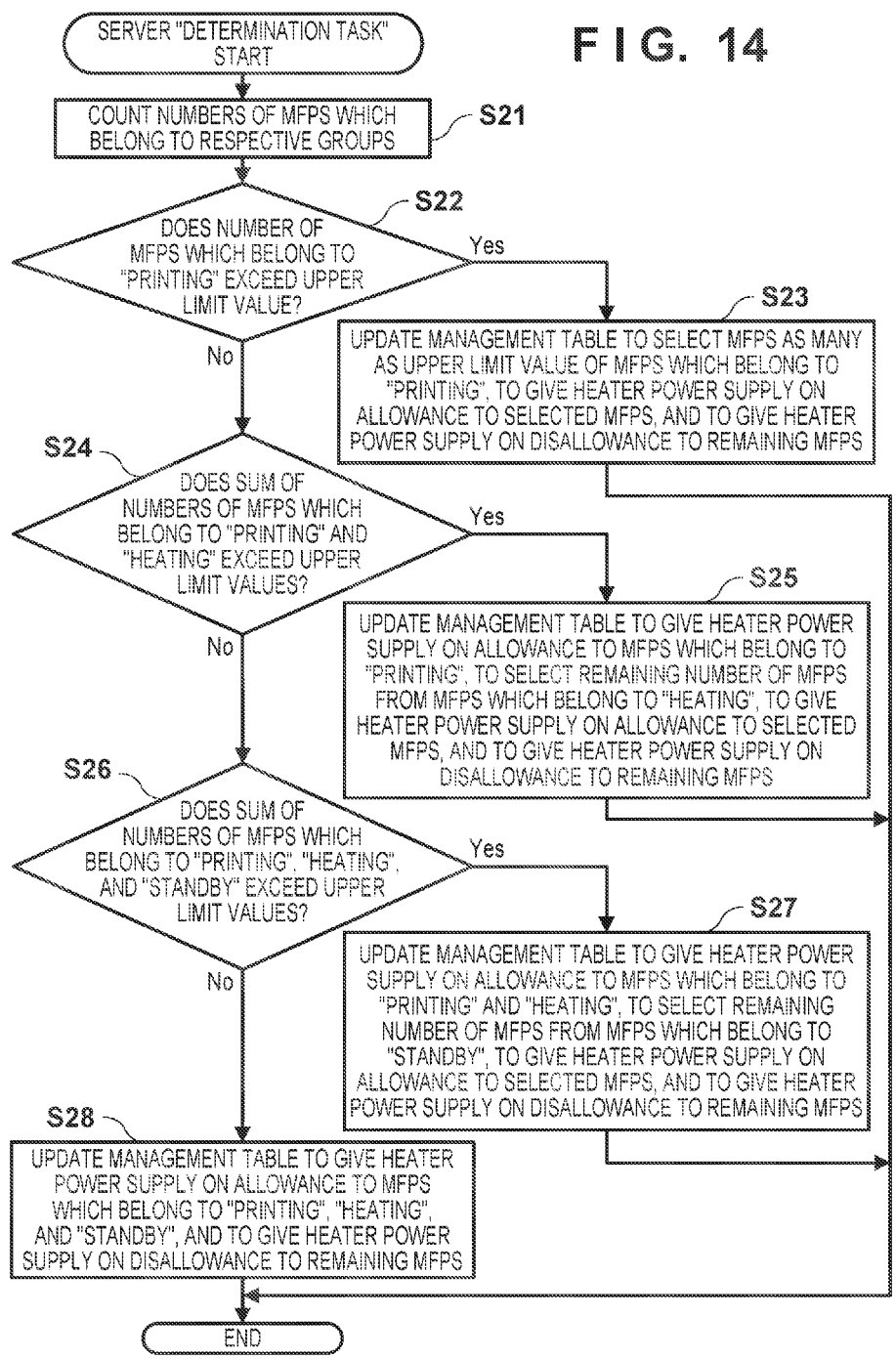
FIG. 14 is a flowchart showing the sequence of determination task processing of the server 100.

FIG. 14 is a flowchart showing the sequence of the determination task processing of the server 100 according to the first embodiment. The server 100 determines a power supply ON allowance/disallowance of the heater 207 for each MFP 104 registered in the management table 1201 by periodically executing processing by means of the determination task. Also, the server 100 updates the management table 1201 based on the determination result.

In step S21, the CPU of the server 100 counts, for respective groups, the numbers of MFPs which belong to respective groups with reference to the management table 1201. The CPU determines in step S22 whether or not the number of MFPs which belong to the "printing" group 803 exceeds 50 as the upper limit value. If the number of MFPs which belong to the "printing" group 803 exceeds the upper limit value, the CPU selects 50 MFPs of those which belong to the "printing" group 803, gives a heater power supply ON allowance to the selected MFPs, and gives a heater power supply ON disallowance to the remaining MFPs in step S23. Furthermore, the CPU writes the result in the management table 1201, thus ending the processing. In this case, the CPU selects MFPs to which a power supply ON allowance of the heater 207 is given of those which belong to the "printing" group 803 in turn from those which have longer group durations 1207.

If it is determined in step S22 that the number of MFPs which belong to the "printing" group 803 does not exceed 50, the CPU determines in step S24 whether or not a total of the numbers of MFPs which belong to the "printing" group 803 and "heating" group 802 exceeds the upper limit value (50). If the total exceeds the upper limit value, the CPU gives a power supply ON allowance of the heater 207 to all the MFPs which belong to the "printing" group 803 in step S25. Also, the CPU selects MFPs, the number of which corresponds to a difference between the upper limit value and the number of MFPs which belong to the "printing" group 803, and to which an allowance can be given, from those which belong to the "heating" group 802. The CPU gives a power supply ON allowance of the heater 207 to the selected MFPs, and gives a power supply ON disallowance of the heater 207 to the remaining MFPs. Furthermore, the CPU writes the result in the management table 1201, thus ending the processing. In this case, the CPU selects MFPs to which a power supply ON allowance of the heater 207 is given of those which belong to the "heating" group 802 in turn from those which have longer group durations 1207.

If it is determined in step S24 that the sum of the numbers of MFPs which belong to the "printing" group 803 and "heating" group 802 does not exceed the upper limit value (50), the CPU determines in step S26 whether a total of the numbers of MFPs which belong to the "printing" group 803, "heating"

group 802, and "standby" group 804 exceeds 50. If the total exceeds 50 in step S27, the CPU gives a heater power supply ON allowance to all MFPs which belong to the "printing" group 803 and "heating" group 802, and selects remaining MFPs to which an allowance can be given from those which belong to the "standby" group 804. The CPU gives a power supply ON allowance of the heater 207 to the selected MFPs, and gives a power supply ON disallowance of the heater 207 to the remaining MFPs. Furthermore, the CPU writes the result in the management table 1201, thus ending the processing. In this case, the CPU selects MFPs to which a power supply ON allowance of the heater 207 is given of those which belong to the "standby" group 804 in turn from those which have longer group durations 1207.

On the other hand, if it is determined in step S26 that the sum of the numbers of MFPs which belong to the "printing" group 803, "heating" group 802, and "standby" group 804 does not exceed the upper limit value (50), the CPU updates the management table 1201 to give a heater power supply ON allowance to all the MFPs which belong to the "printing" group 803, "heating" group 802, and "standby" group 804 in step S28.

<Processing Sequence of MFP>

The processing of the MFP 104 according to the first embodiment will be described below with reference to FIGS. 15 and 16. In the MFP 104, a communication task (FIG. 15) and a heater control task (FIG. 16) are running parallelly. These processes are implemented when the CPU 302 included in the MFP 104 expands programs stored in, for example, an HDD onto a RAM, and executes the expanded programs.

[Communication Task Processing Sequence (FIG. 15)]

Figure 15:
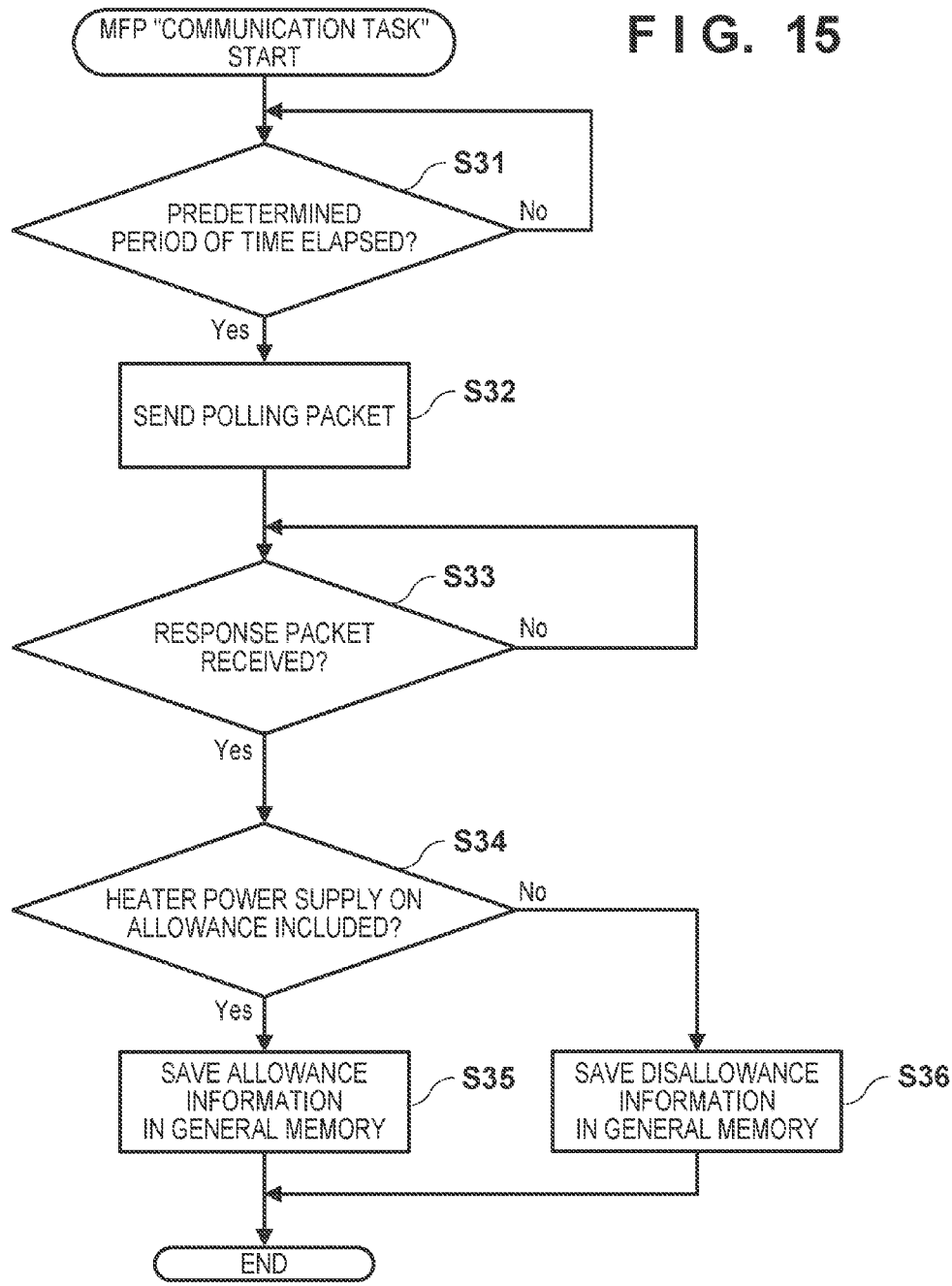
FIG. 15 is a flowchart showing the sequence of communication task processing of an MFP.

FIG. 15 is a flowchart showing the sequence of the processing of the communication task in the MFP 104 according to the first embodiment. The communication task of the MFP 104 executes the following two processes.

(1) The MFP 104 sends polling packets at given intervals to the server 100 via the network I/F 301 under the control of the CPU 302.

(2) The MFP 104 receives a response packet to the polling packet from the server 100, extracts an instruction of a power supply ON allowance or disallowance of the heater 207 included in the response packet, and saves the instruction in the general memory 307.

In step S31, the CPU 302 waits for an elapse of a predetermined period of time from the previous sending timing of a polling packet. In step S32, the CPU 302 sends a polling packet to the server 100. In this embodiment, the polling packet includes information of the address 1203, serial number 1204, model name 1205, group 1206, and group duration 1207 of the MFP as the apparatus information and operation state information, as described above. The CPU 302 waits until a response packet is received from the server 100 in step S33. Upon reception of a response packet from the server 100, the CPU 302 extracts information indicating a power supply ON allowance or disallowance of the heater 207 from the received response packet in step S34. If the power supply ON allowance of the heater 207 is received from the server 100, the CPU 302 saves information indicating an allowance in the general memory 307 in step S35, thus ending the processing. On the other hand, if the disallowance is received, the CPU 302 saves information indicating a disallowance in the general memory 307 in step S36, thus ending the processing.

[Heater Control Task Processing Sequence (FIG. 16)]

Figure 16:
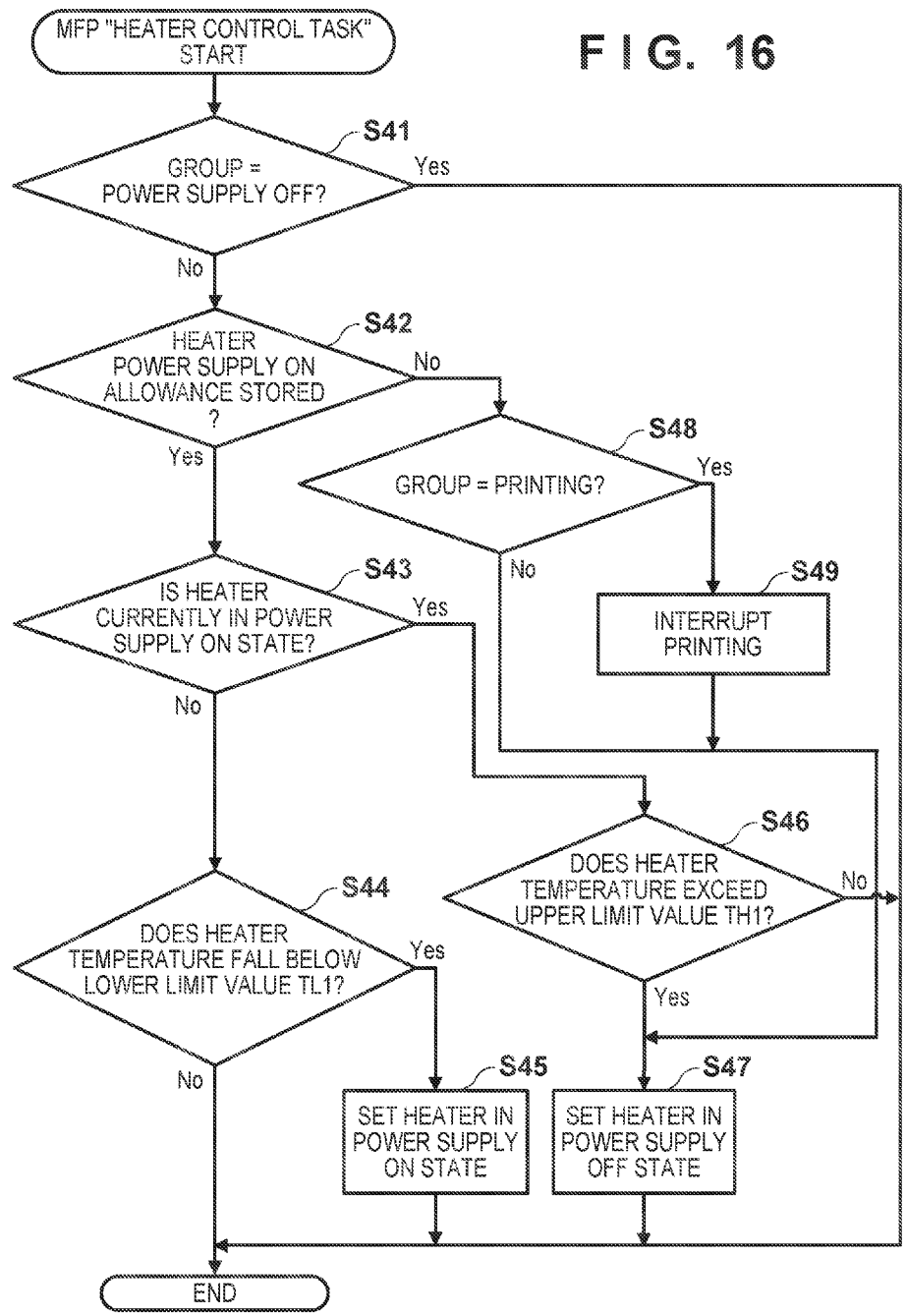
FIG. 16 is a flowchart showing the sequence of heater control task processing of the MFP.

FIG. 16 is a flowchart showing the sequence of the processing of the heater control task in the MFP 104 according to the first embodiment. In the heater control task, the MFP 104 reads the temperature of the heater 207 using the temperature sensor 208, and controls power supply ON/OFF states of the heater 207 so that the temperature of the heater 207 falls within the predetermined temperature range, under the control of the CPU 302. Note that in this embodiment, the temperature range corresponds to that between the upper limit value TH1 and lower limit value TL1 shown in FIG. 6. Note that the MFP 104 can supply an electric power to the heater 207 only when it receives a heater power supply ON allowance notification from the server 100.

The CPU 302 determines in step S41 whether or not the group to which the MFP 104 belongs is the "power supply OFF" group 801. If the group to which the MFP 104 belongs is other than the "power supply OFF" group 801, the CPU 302 determines in step S42 with reference to the general memory 307 whether or not the power supply ON allowance of the heater 207 is stored. If the power supply ON allowance is stored, the CPU 302 determines in step S43 whether or not the heater 207 is currently in a power supply ON state. If the heater 207 is currently not in a power supply ON state, the CPU 302 reads the temperature of the heater 207 indicated by the sensor 208, and determines in step S44 if the read temperature falls below the lower limit value TL1. If the temperature does not fall below the lower limit value TL1, the CPU 302 keeps a power supply OFF state of the heater 207, thus ending the processing. However, if the temperature falls below the lower limit value TL1, the CPU 302 sets the heater 207 in a power supply ON state in step S45, thus ending the processing.

If it is determined in step S43 that the heater 207 is currently in a power supply ON state, the CPU 302 reads the temperature of the heater 207 using the temperature sensor 208, and determines in step S46 whether or not the read temperature exceeds the upper limit value TH1. If the temperature exceeds the upper limit value TH1, the CPU 302 sets the heater 207 in a power supply OFF state in step S47, thus ending the processing. However, if the temperature does not exceed the upper limit value TH1, the CPU 302 keeps a power supply ON state of the heater 207, thus ending the processing.

If it is determined in step S42 that the power supply ON disallowance of the heater 207 is stored, the CPU 302 determines in step S48 whether or not the group to which the MFP 104 belongs is the "printing" group 803. If the group to which the MFP 104 belongs is not the "printing" group 803, the CPU 302 sets the heater 207 in a power supply OFF state in step S47, thus ending the processing. However, if the group to which the MFP 104 belongs is the "printing" group 803, the CPU 302 interrupts a print operation in step S49, and then sets the heater 207 in a power supply OFF state in step S47, thus ending the processing. This is because a print job has to be interrupted since the heater is set in a power supply OFF state during "printing" 803. If it is determined in step S41 that the group to which the MFP 104 belongs is the "power supply OFF" group 801, since the heater 207 need not be set in a power supply ON state, the CPU 302 keeps the power supply OFF state of the heater 207, thus ending the processing.

As described above, according to this embodiment, the server 100 acquires apparatus information and operation state information from each MFP to be managed, and counts the numbers of MFPs which belong to the respective groups which are defined in accordance with the operation states of the MFPs. The server 100 determines whether or not a power supply allowance of the heater 207 is to be given to each MFP in accordance with the priorities of the groups and those in each group. Each MFP sends the apparatus information and operation state information to the server 100. When a power supply ON allowance instruction of the heater 207 is received from the server 100, the MFP sets the heater 207 in a power supply ON state; when a disallowance is received, it does not set the heater 207 in a power supply ON state. In this manner, by setting the upper limit of the number of MFPs to which the server 100 gives a power supply ON allowance of the heater 207 in correspondence with the operation states of the MFPs, the total power consumption amount of a plurality of MFPs managed by the server 100 can be limited. Also, while limiting the total power consumption amount of the plurality of MFPs, usability of each MFP can be prevented from being impaired (for example, a waiting time period until a print operation is started in that MFP can be prevented from being prolonged due to the limited total power consumption amount).

Second Embodiment

The second embodiment will exemplify a case in which a sum total of power consumption values of respective MFPs is used in place of the number of MFPs as an upper limit value used as a criterion required to limit the total power consumption amount of a plurality of MFPs. The power consumption values of the MFPs are different depending on models. Hence, in an environment in which a plurality of models are operating together, it is often desirable to specify the upper limit value by the sum total of power consumption values rather than the number of MFPs. When the upper limit value is specified by the number of MFPs, the sum total of power consumption values of respective MFPs in a case in which MFPs to which a heater power supply ON allowance is given include many models with smaller power consumption amounts has a difference from that in a case in which these MFPs include many models with larger power consumption amounts, thus posing a problem.

Figure 17:
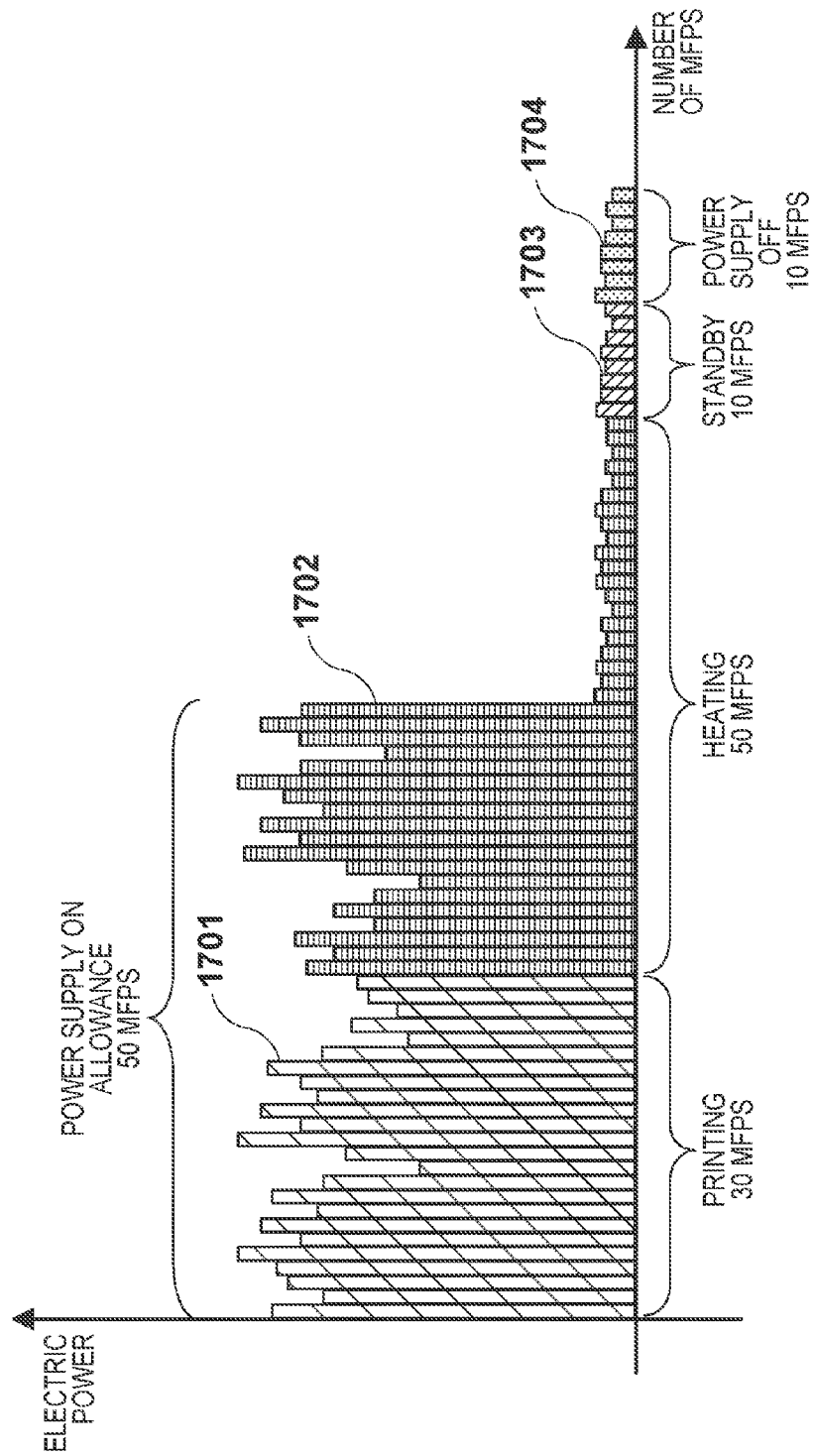
FIG. 17 is a graph showing the determination result of a server when the sum total of power consumption values of MFPs in a "printing" group 803 and "heating" group 802 exceeds an upper limit value according to the second embodiment of the present invention.

<System Configuration>
[Relationship Between Numbers of MFPs and Power Consumption Values for Respective States (FIG. 17)]
FIG. 17 shows a determination result of a server when a sum total of power consumption values of MFPs which belong to a "printing" group 803 and "heating" group 802 exceeds an upper limit value according to the second embodiment. At an instance shown in FIG. 17, 30 MFPs belong to the "printing" group 803, 50 MFPs belong to the "heating" group 802, 10 MFPs belong to a "standby" group 804, and 10 MFPs belong to a "power supply OFF" group 801. In this embodiment, the upper limit value of a total power consumption value is 60 kW. The sum total of power consumption values of 30 MFPs which belong to the "printing" group 803 does not exceed the upper limit value. However, when the sum total of power consumption values of MFPs which belong to the "heating" group 802 is added to that of power consumption values of MFPs which belong to the "printing" group 803, the sum exceeds the upper limit value. Therefore, a server 100 gives a power supply ON allowance of a heater 207 to the 30 MFPs which belong to the "printing" group 803, and selects MFPs to which a power supply ON allowance of the heater 207 is to be given of the 50 MFPs which belong to the "heating" group 802. The server 100 adds, to the sum total of power consumption values of the MFPs which belong to the "printing" group 803, power consumption values in turn from MFPs having longer group durations 1207 of the 50 MFPs which belong to the "heating" group 802. Furthermore, the server 100 decides MFPs to which a power supply ON allowance of the heater 207 is to be given within a range in which the value obtained by the addition does not exceed the upper limit value.

[Example of Management Table (FIG. 18)]
FIG. 18 shows an example of a management table 1801 according to the second embodiment. In the management table 1801, a column of a power consumption 1802 is added to the management table 1201 described in the first embodiment. The power consumption 1802 indicates a power consumption value of each MFP, and that value is held as a predetermined value in each MFP. In this embodiment, the power consumption 1802 is a maximum power consumption value of each MFP 104. The power consumption 1802 is included in a polling packet which is sent from each MFP to the server 100 as a part of operation state information, and the server 100 holds the power consumption 1802 received by a communication task in the management table 1801 together with remaining pieces of apparatus information and operation state information.

Figure 19:
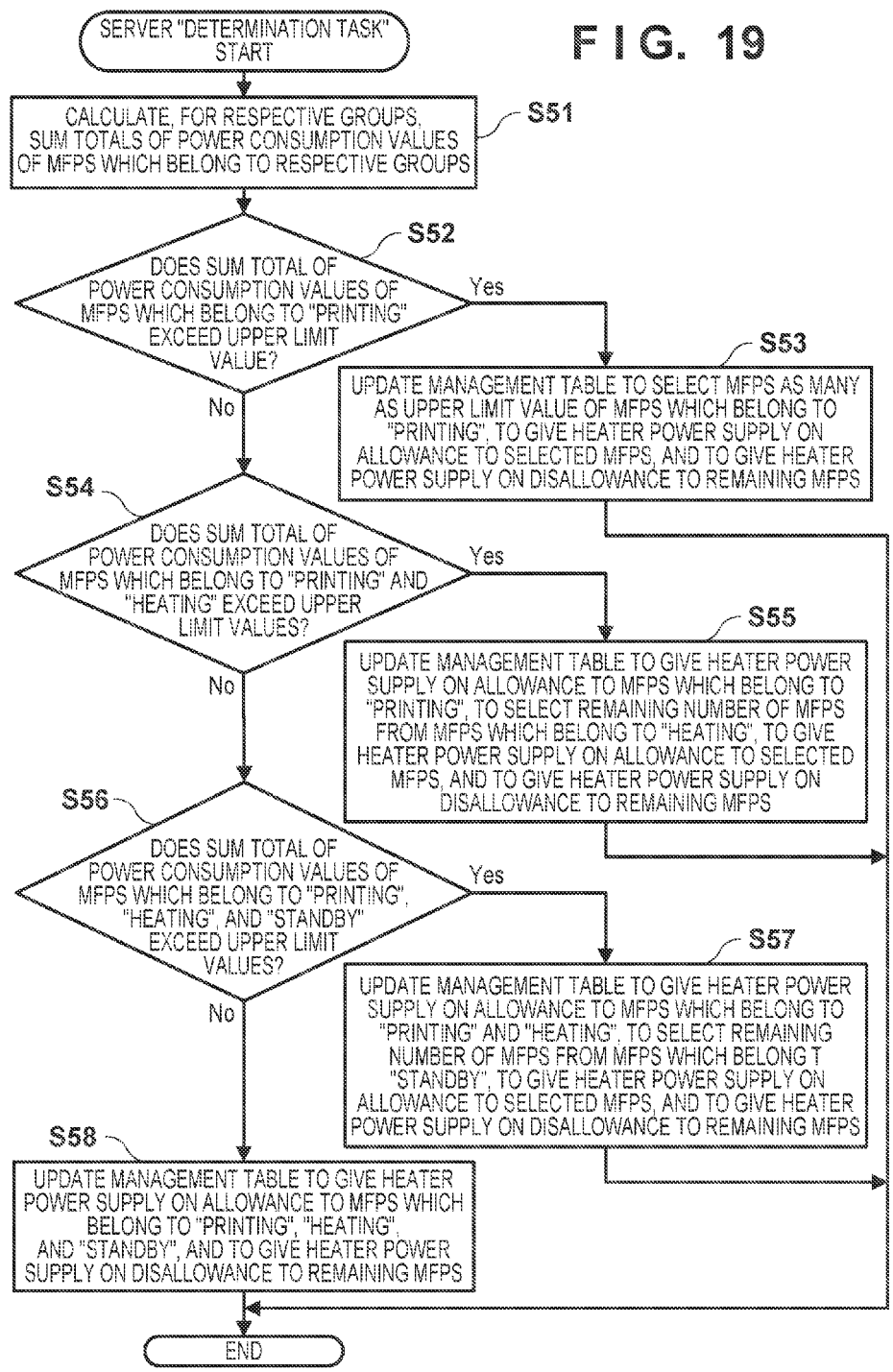
FIG. 19 is a flowchart showing the sequence of determination task processing of a server 100.

<Processing Sequence of Server>
[Determination Task Processing Sequence (FIG. 19)]
FIG. 19 is a flowchart showing the sequence of determination task processing of the server 100 according to the second embodiment. FIG. 19 is similar to the determination task described using FIG. 14 of the first embodiment. Unlike in FIG. 14, a determination criterion as to whether or not to give a power supply ON allowance of the heater 207 is the sum total of power consumption values in place of the number of MFPs.

In step S51, a CPU of the server 100 calculates, for respective groups, sum totals of power consumption values of MFPs which belong to the respective groups with reference to the management table 1801. The CPU determines in step S52 whether or not the sum total of power consumption values of MFPs which belong to the "printing" group 803 exceeds 60 kW as the upper limit value. If the sum total exceeds 60 kW, the CPU selects in step S53 the maximum number of MFPs, the sum total of power consumption values of which does not exceed the upper limit value (60 kW), of those which belong to the "printing" group 803. The CPU gives a power supply ON allowance of the heater 207 to the selected MFPs, and gives a power supply ON disallowance of the heater 207 to the remaining MFPs. After that, the CPU writes the result in the management table 1801, thus ending the processing. In this case, the CPU adds power consumption values of MFPs which belong to the "printing" group 803 in turn from those having longer group durations 1207, and selects the maximum number of MFPs, the sum of power consumption values of which does not exceed 60 kW as the upper limit value, thus selecting the MFPs to which a heater power supply ON allowance is given from those which belong to the "printing" group 803.

If it is determined in step S52 that the sum total of power consumption values of MFPs which belong to the "printing" group 803 does not exceed 60 kW as the upper limit value, the CPU determines in step S54 whether or not the sum total of power consumption values of MFPs which belong to the "printing" group 803 and "heating" group 802 exceeds 60 kW. If the sum total exceeds 60 kW, the CPU gives a power supply ON allowance of the heater 207 to all the MFPs which belong to the "printing" group 803, and selects some MFPs of those which belong to the "heating" group 802 as MFPs to which a power supply ON allowance is to be given in step S55. The CPU gives a power supply ON allowance of the heater 207 to the selected MFPs, and gives a power supply ON disallowance of the heater 207 to the remaining MFPs. Furthermore, the CPU writes the result in the management table 1801, thus ending the processing. In this case, the CPU adds power consumption values of MFPs which belong to the "heating" group 802 in turn from those having longer group durations 1207, and selects the maximum number of MFPs, the sum of power consumption values of which does not exceed 60 kW as the upper limit value, thus selecting the MFPs to which a power supply ON allowance of the heater 207 is to be given.

If it is determined in step S54 that the sum total of power consumption values does not exceed the upper limit value (60 kW), the CPU further determines in step S56 whether or not the sum total of power consumption values of MFPs, which belong to the "printing" group 803, "heating" group 802, and "standby" group 804, exceeds 60 kW. If the sum total exceeds 60 kW, the CPU gives a power supply ON allowance of the heater 207 to all MFPs which belong to the "printing" group 803 and "heating" group 802, and selects some MFPs of those which belong to the "standby" group 804 as MFPs to which a power supply ON allowance is to be given in step S57. The CPU gives a power supply ON allowance of the heater 207 to the selected MFPs, and gives a power supply ON disallowance of the heater 207 to the remaining MFPs. Furthermore, the CPU writes the result in the management table 1801, thus ending the processing. In this case, the CPU adds power consumption values of MFPs which belong to the "standby" group 804 in turn from those having longer group durations 1207, and selects the maximum number of MFPs, the sum of power consumption values of which does not exceed 60 kW as the upper limit value, thus selecting the MFPs to which a power supply ON allowance of the heater 207 is to be given.

As described above, according to this embodiment, the server 100 calculates the sum totals of power consumption values of MFPs which belong to the respective groups to have a power consumption value as the upper limit value used as a criterion required to limit the total power consumption amount of a plurality of MFPs. Furthermore, the server 100 determines whether or not a power supply allowance of the heater 207 is to be given to each MFP in accordance with the priorities of the groups and those in each group. Thus, in addition to the effects of the first embodiment, in an environment in which a plurality of models of MFPs are used together, the sum total of power consumption values of MFPs to which a power supply ON allowance of the heater 207 is given can be controlled to be a value closer to the upper limit value.

In the aforementioned example of this embodiment, each MFP holds the power consumption value as a fixed value in advance. For example, a predetermined value may be set for each group. Alternatively, the server 100 may hold a power consumption value for each model, and a power consumption value corresponding to an MFP specified by model information received from that MFP may be used in the aforementioned determination task. Alternatively, a measured value by a power meter included in each MFP may be used in the aforementioned determination task.

Third Embodiment

The third embodiment uses the number of MFPs as an upper limit value used as a criterion required to limit the total power consumption amount of a plurality of MFPs as in the first embodiment. However, this embodiment will explain an example in which when a power supply allowance is given to MFPs in descending order of priority, operations of MFPs which belong to a group, for which the upper limit value is exceeded first, are limited, thereby suppressing the sum total of power consumption values of a plurality of MFPs to be equal to or smaller than a given value.

The first embodiment executes control to give a heater power supply ON allowance to some MFPs which belong to a group for which the upper limit value is exceeded in a determination task, and to give a heater power supply ON disallowance to the remaining MFPs. In this case, power consumption differences among MFPs which belong to the single group become large. In this embodiment, the operation of a server 100 described in the first embodiment is modified so as to reduce power consumption differences among MFPs while reducing the total power consumption amount of all MFPs which belong to the single group. More specifically, this embodiment is characterized in that an upper limit value is set for a duty ratio of a current to be supplied to a heater 207.

<System Configuration>

[Relationship Between Numbers of MFPs and Power Consumption Values for Respective Operation States (FIGS. 20 and 21)]

Figure 20:
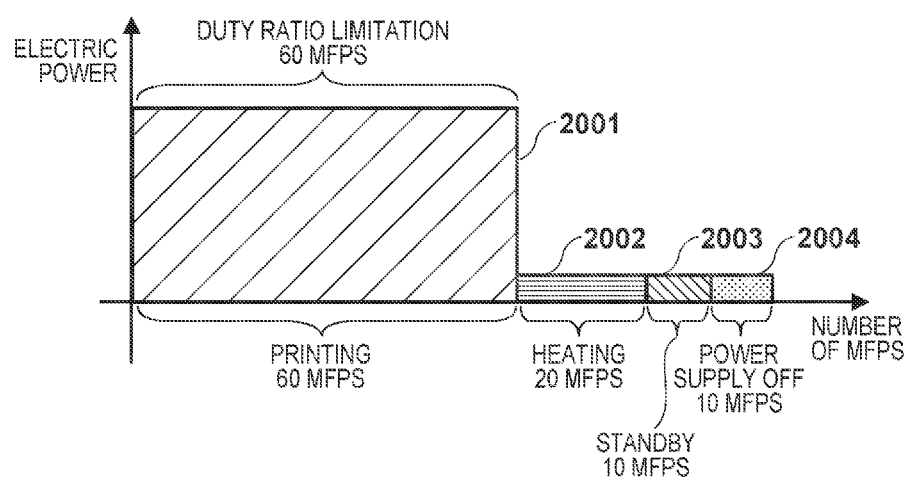
FIG. 20 is a graph showing the determination result of a server when the number of MFPs in a "printing" group 803 exceeds an upper limit value according to the third embodiment of the present invention.

FIG. 20 shows a determination result of the server when the number of MFPs which belong to a "printing" group 803 exceeds an upper limit value according to the third embodiment. At an instance shown in FIG. 20, 60 MFPs belong to the "printing" group 803, 20 MFPs belong to a "heating" group, 10 MFPs belong to a "standby" group, and 10 MFPs belong to a "power supply OFF" group. In this embodiment, the upper limit value (the number of MFPs) used as a criterion required to limit the total power consumption amount of a plurality of MFPs is 50 (MFPs). In FIG. 20, the number of MFPs which belong to the "printing" group 803 exceeds the upper limit value. In this case, when the power consumption values of 60 MFPs which belong to the "printing" group 803 are respectively limited to 50/60, the total power consumption value of the 60 MFPs after the limitation is equivalent to that of 50 MFPs before the limitation. Therefore, the server 100 instructs the MFPs which belong to the "printing" group 803 to limit an upper limit value of a duty ratio of a current to be supplied to the heater 207 to 50/60 (limitation notification). On the other hand, the server 100 does not give any power supply ON allowance of the heater 207 to MFPs which belong to other groups.

Figure 21:
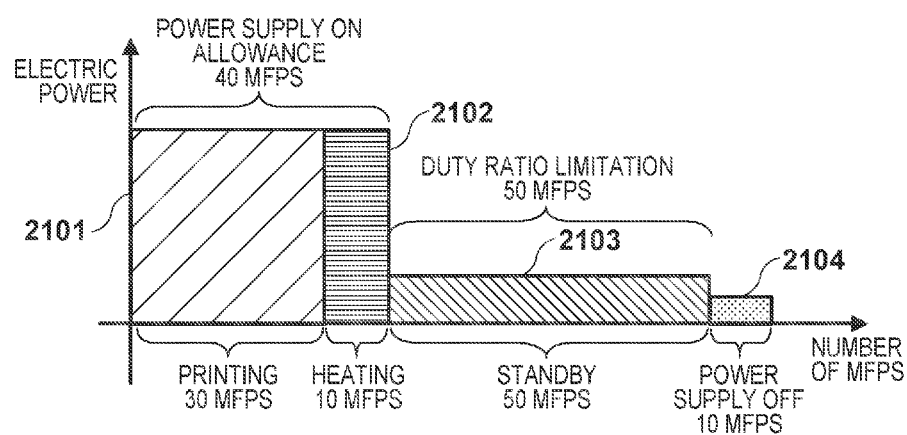
FIG. 21 is a graph showing the determination result of the server when the sum of the numbers of MFPs in the "printing" group 803, a "heating" group 802, and a "standby" group 804 exceeds the upper limit value.

FIG. 21 shows the determination result of the server when the number of MFPs which belong to the "printing" group 803, "heating" group 802, and "standby" group 804 exceeds the upper limit value according to the third embodiment. At an instance shown in FIG. 21, 30 MFPs belong to the "printing" group 803, 10 MFPs belong to the "heating" group 802, 50 MFPs belong to the "standby" group 804, and 10 MFPs belong to the "power supply OFF" group 801. In FIG. 21, the upper limit value is set to be 50 (MFPs) as in FIG. 20. In FIG. 21, the sum total of the numbers of MFPs which belong to the "printing" group 803 and "heating" group 802 does not exceed 50 as the upper limit value. For this reason, the server 100 gives an power supply ON allowance instruction of the heater 207 to the respective MFPs which belong to the "printing" group 803 and "heating" group 802. As a result, from the upper limit value, the remaining number of MFPs to which a power supply allowance of the heater 207 can be given is 10. However, the number (50) of MFPs which belong to the "standby" group 804 exceeds the upper limit value by 40. In this case, when the power consumption values of the 50 MFPs which belong to the "standby" group 804 are respectively limited to 10/50, the total power consumption value of the 50 MFPs after the limitation becomes equivalent to that of 10 MFPs before the limitation. Therefore, the server 100 instructs the MFPs which belong to the "standby" group 804 to limit an upper limit value of a duty ratio of a current to be supplied to the heater 207 to 10/50 (limitation notification).

[Example of Management Table (FIG. 22)]

FIG. 22 shows an example of a management table 2201 according to the third embodiment. In the management table

2201, the power supply ON allowance 1208 of the heater 207 included in the management table 1201 described in the first embodiment is changed to a power supply ON allowance of the heater 207/duty ratio 2202. In the power supply ON allowance of the heater 207/duty ratio 2202, a flag indicating one of a power supply allowance and disallowance of the heater 207, or an upper limit value of a duty ratio of a current to be supplied to the heater 207 can be set. In FIG. 22, for MFPs with management numbers #004 and #005, the upper limit value of the duty ratio is limited to 80%.

<Processing Sequence of Server>

[Determination Task Processing Sequence (FIG. 23)]

Figure 23:
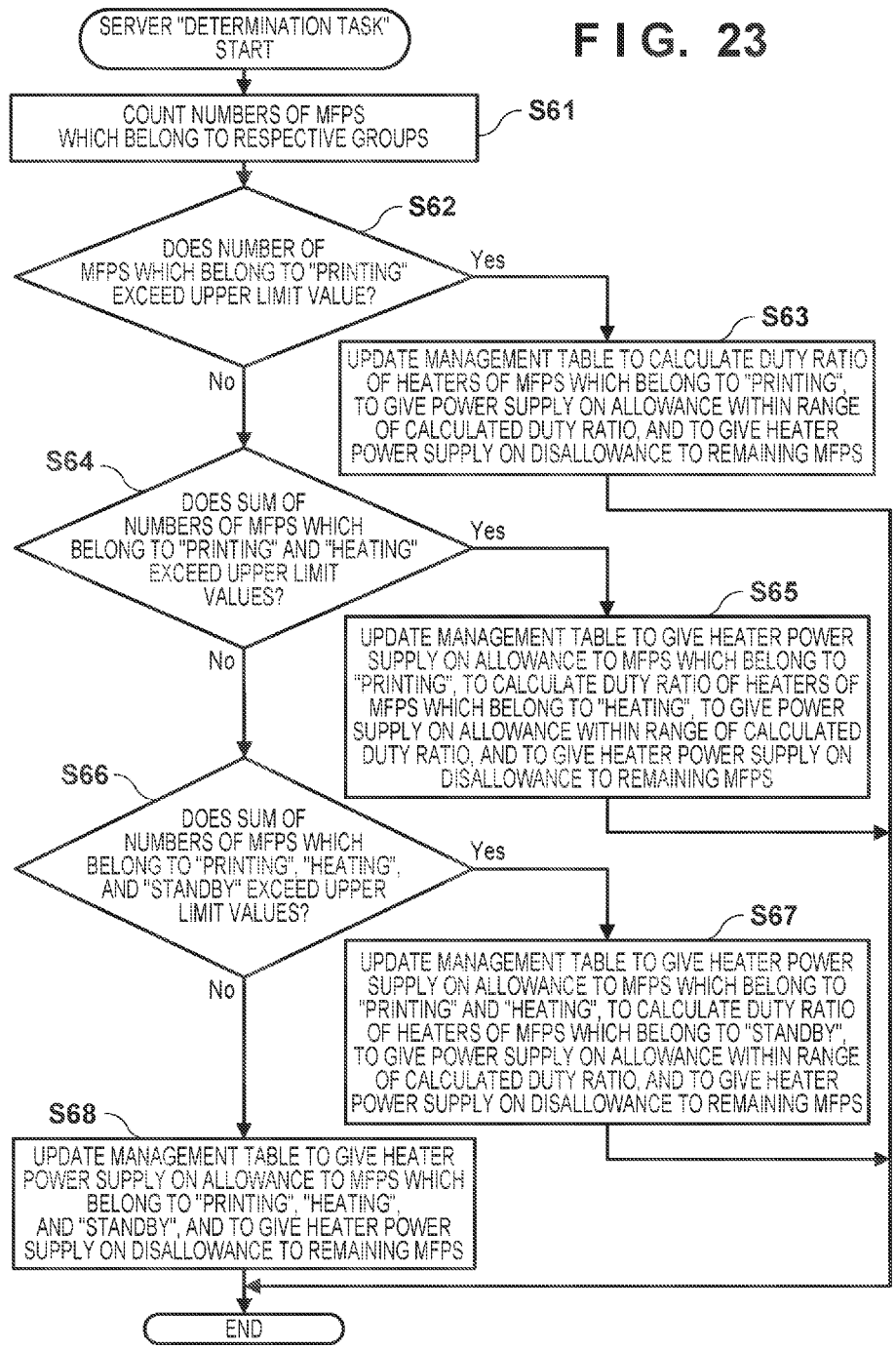
FIG. 23 is a flowchart showing the sequence of determination task processing of a server 100.

FIG. 23 is a flowchart showing the sequence of determination task processing of the server 100 according to the third embodiment. FIG. 23 is similar to the determination task described using FIG. 14 of the first embodiment. Unlike in FIG. 14, as the determination result of the server 100, in addition to a power supply ON allowance/disallowance of the heater 207, a duty ratio is designated when the allowance is given.

In step S61, the CPU of the server 100 calculates, for respective groups, sums of the numbers of MFPs which belong to respective groups with reference to the management table 2201. The CPU determines in step S62 whether or not the number of MFPs which belong to the "printing" group 803 exceeds 50 as the upper limit value. If the number of MFPs which belong to the "printing" group 803 exceeds the upper limit value, the CPU calculates a limit value of a duty ratio for the MFPs which belong to the "printing" group 803, and gives a power supply ON disallowance of the heater 207 to the remaining MFPs in step S63. After that, the CPU writes the result in the management table 2201, thus ending the processing.

If it is determined in step S62 that the number of MFPs which belong to the "printing" group 803 does not exceed the upper limit value (50), the CPU determines in step S64 whether or not a sum of the numbers of MFPs which belong to the "printing" group 803 and "heating" group 802 exceeds the upper limit value. If the total exceeds the upper limit value, the CPU gives a power supply ON allowance of the heater 207 to all the MFPs which belong to the "printing" group 803 in step S65. Also, the CPU calculates a limit value of a duty ratio for the MFPs which belong to the "heating" group 802, and gives a power supply ON disallowance of the heater 207 to the remaining MFPs. After that, the CPU writes the result in the management table 2201, thus ending the processing.

If it is determined in step S64 that the sum of the numbers of MFPs which belong to the "printing" group 803 and "heating" group 802 does not exceed 50, the CPU determines in step S66 whether a sum of the numbers of MFPs which belong to three groups, that is, the "printing" group 803, "heating" group 802, and "standby" group 804 exceeds the upper limit value (50). If the sum exceeds 50, the CPU gives a power supply ON allowance of the heater 207 to all MFPs which belong to the two groups, that is, the "printing" group 803 and "heating" group 802, and calculates a limit value of a duty ratio for MFPs which belong to the "standby" group 804 in step S67. After that, the CPU writes the result in the management table 2201, thus ending the processing.

On the other hand, if it is determined in step S66 that the sum of the numbers of MFPs which belong to the three groups, that is, the "printing" group 803, "heating" group 802, and "standby" group 804 does not exceed the upper limit value (50), the CPU updates the management table 2201 to give a power supply ON allowance of the heater 207 to all the MFPs which belong to the three groups, that is, the "printing" group 803, "heating" group 802, and "standby" group 804 in step S68.

Note that this embodiment uses the number of MFPs as a parameter indicating power consumption values of MFPs. Alternatively, as described in the second embodiment, the sum total of power consumption values of respective MFPs may be used as a parameter indicating power consumption values of MFPs.

<Processing Sequence of MFP>

[Heater Control Task Processing Sequence (FIGS. 24 and 25)]

Figure 24:
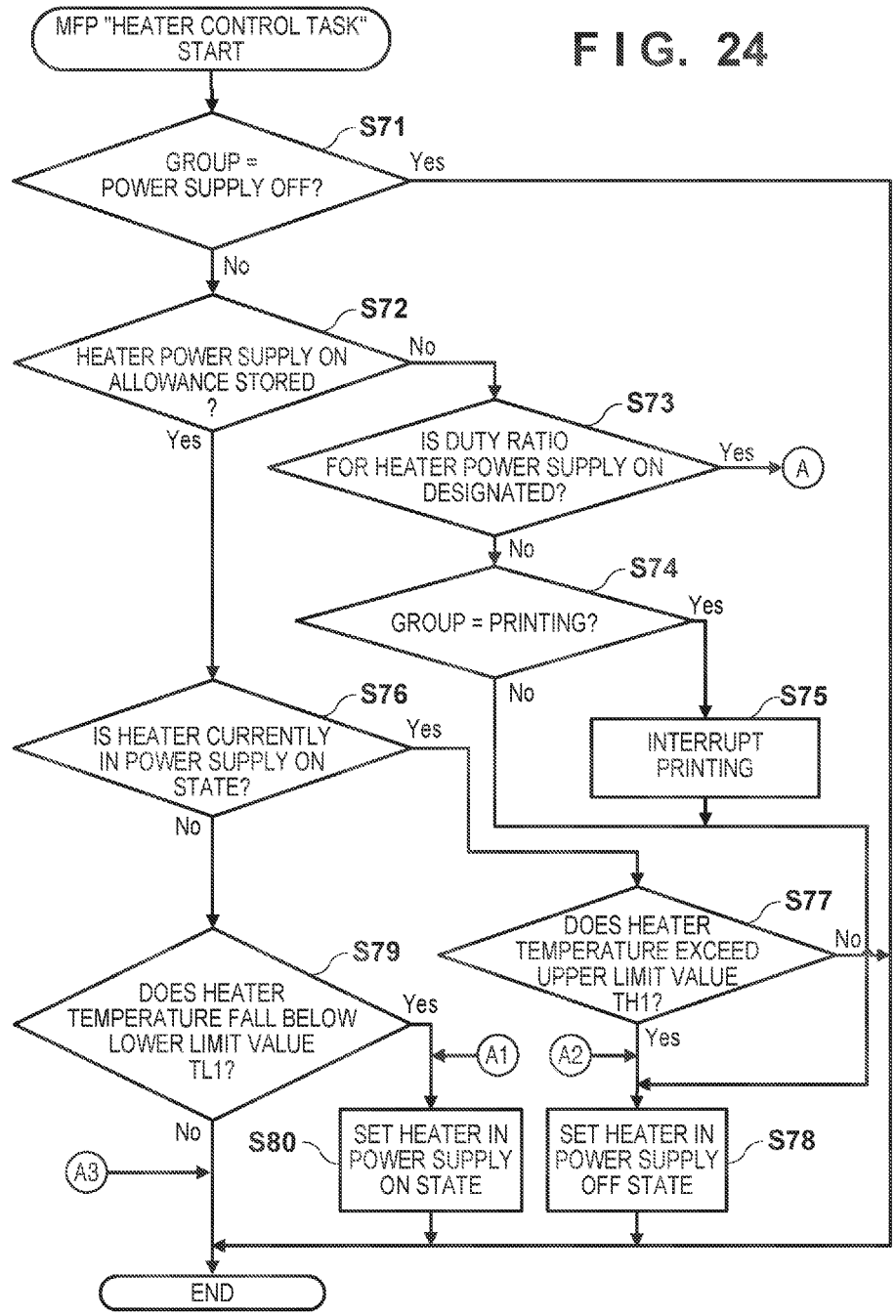
FIG. 24 is a flowchart showing the sequence of heater control task processing of an MFP.

FIGS. 24 and 25 are flowcharts showing the sequence of a heater control task in an MFP 104 according to the third embodiment. FIGS. 24 and 25 are similar to the heater control task processing described using FIG. 16 of the first embodiment, and correspond to the sequence to which the operation of the MFP 104 when a duty ratio of a current to be supplied to the heater 207 is designated by the server 100 is added.

In addition to control of the power supply ON/OFF state of the heater 207 so that the temperature of the heater 207 falls within a range specified by an upper limit value TH1 and lower limit value TL1, as described in the first embodiment, when an accumulated duty ratio exceeds a duty ratio designated by the server 100, the heater 207 has to be set in a power supply OFF state. The accumulated duty ratio (Dt) can be calculated using accumulated previous power supply ON times Ton and accumulated previous power supply OFF times Toff (ΣTon, Σoff), that is, it can be calculated by:

$$Dt = \Sigma Ton/(\Sigma Ton + \Sigma Toff) \tag{1}$$

Referring to FIG. 24, a CPU 302 of the MFP 104 determines in step S71 whether or not a group to which an MFP of interest belongs is the "power supply OFF" group 801. If the group is not the "power supply OFF" group 801, the CPU 302 determines in step S72 with reference to a general memory 307 whether or not a heater power supply ON allowance is stored. The processes (S76 to S80) when the allowance is stored are the same as the operations described in FIG. 16, and a description thereof will not be repeated. If a disallowance is stored, the CPU 302 determines in step S73 whether or not a duty ratio of a current to be supplied to the heater 207 is designated. The processes (S74, S75, S78) when no duty ratio is designated, and the power supply disallowance of the heater 207 is stored are the same as the operations described in FIG. 16, and a description thereof will not be repeated. On the other hand, if it is determined in step S73 that a duty ratio is designated, the CPU 302 advances the process to step S81 in FIG. 25.

Referring to FIG. 25, the CPU 302 determines in step S81 whether or not a group to which the MFP 104 currently belongs is the "printing" group 803. If the current group is the "printing" group 803, the CPU 302 changes a print speed (operating condition) according to the designated duty ratio in step S82. This is because since the duty ratio of the heater 207 is limited, the target temperature of the heater 207 has to be lowered. As a result, in order to attain a print operation with a high image quality even when the heater 207 is at a lower temperature, the print speed has to be lowered according to the designated duty ratio. Letting Sorg be an (original) print speed before it is changed, Sdown be a changed print speed, and D be a duty ratio designated from the server 100, the CPU 302 changes the print speed to meet:

$$Sdown = Sorg \times D \tag{2}$$

As the method of lowering the print speed, two methods, that is, a method of lowering a moving speed of a print sheet, and a method of prolonging a time interval (paper feed interval or paper discharge interval) between which print sheets of a given page and the next page pass through a fixing unit heated by the heater 207 while the moving speed remains the same are available.

The CPU 302 determines in step S83 whether or not the heater 207 is currently in a power supply ON state. If the heater 207 is in a power supply OFF state, the CPU 302 reads the temperature of the heater 207 indicated by the sensor 208, and determines in step S84 whether or not the read temperature falls below the lower limit value TL1. If the temperature falls below the lower limit value TL1, the CPU 302 determines in step S85 whether or not the accumulated duty ratio Dt is equal to or lower than the duty ratio D designated by the server 100. If Dt≤D, since the heater 207 can be set still in a power supply ON state, the CPU 302 sets the heater 207 in a power supply ON state in step S80, thus ending the processing. On the other hand, if it is determined in step S85 that the accumulated duty ratio Dt is larger than the designated duty ratio D, the CPU 302 ends the processing while keeping a power supply OFF state of the heater 207. Also, if it is determined in step S84 that the temperature of the heater 207 does not fall below the lower limit value TL1, the CPU 302 ends the processing while keeping a power supply OFF state of the heater 207.

If it is determined in step S83 that the heater 207 is currently in a power supply ON state, the CPU 302 reads the temperature of the heater 207 using the temperature sensor 208, and determines in step S86 whether or not the read temperature exceeds the upper limit value TH1. If the temperature exceeds the upper limit value TH1, the CPU 302 sets the heater 207 in a power supply OFF state in step S78, thus ending the processing. On the other hand, if the temperature does not exceed the upper limit value TH1, the CPU 302 determines in step S87 that the accumulated duty ratio Dt is equal to or larger than the duty ratio D designated by the server 100. If Dt≥D, even when the temperature of the heater 207 does not exceed TH1, the CPU 302 sets the heater 207 in a power supply OFF state in step S78, thus ending the processing. On the other hand, if Dt<D, the CPU 302 ends the processing while keeping a power supply ON state of the heater 207.

As described above, the number of MFPs is used as the upper limit value used as a criterion required to limit the total power consumption amount of a plurality of MFPs, and the server 100 limits the duty ratio of a current to be supplied to the heaters 207 of MFPs, which belong to a group in which the number of MFPs exceeds the upper limit value, to be equal to or lower than a given value. Thus, the sum total of power consumption values of MFPs can be controlled not to exceed the upper limit value.

As described above, according to the aforementioned first to third embodiments, the server 100 and apparatuses 104, 105, 106, and 107 to be managed cooperate with each other, and the server 100 decides heater operations of the respective apparatuses and instructs them. The server 100 considers heater states and operation states of the respective apparatuses when it decides the heater operations of the apparatuses. Thus, the sum total of power consumption values of the respective apparatuses can be suppressed to a given value or less while reducing a possibility of a longer waiting time until a print operation is started in each apparatus due to a limitation of the power consumption value.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-197144, filed Sep. 2, 2010, which is hereby incorporated by reference herein in its entirety.

What is claimed is:

1. A system for controlling total power consumption of a plurality of apparatuses, the system comprising a server and the plurality of apparatuses each incorporating a device, in which the plurality of apparatuses control power supply ON and OFF states of the devices in accordance with an instruction from the server, the server comprising:

a collecting unit that collects pieces of operation state information indicating operation states of the plurality of apparatuses and pieces of information indicating durations of the operation states from the plurality of apparatuses;

a grouping unit that groups, with reference to the pieces of operation state information collected by said collecting unit, the plurality of apparatuses into groups which respectively correspond to different operation states and respectively have different group priorities to be used when the server gives a device power supply allowance; and a notification unit that sends an allowance notification indicating the device power supply allowance to one or more apparatuses which belong to one or more of the groups in descending order of the group priorities within a range in which a parameter associated with power consumption values of the one or more apparatuses does not exceed an upper limit value which is predetermined in correspondence with a total power consumption amount of the plurality of apparatuses, wherein said notification unit sends the allowance notification to the one or more apparatuses in descending order of the group priorities within a range in which a number of the one or more apparatuses does not exceed the predetermined upper limit value, and when said notification unit gives the device power supply allowance to the one or more apparatuses in descending order of the group priorities, said notification unit gives the device power supply allowance in turn from the apparatuses which have longer durations included in the pieces of operation state information collected by said collecting unit and which belong to a group in which the parameter associated with the power consumption values exceeds the upper limit value first, and each of the plurality of apparatuses comprising:

a control unit that sets the device in a power supply ON state when the allowance notification is received from the server, and sets the device in a power supply OFF state when the allowance notification is not received from the server.

2. The system according to claim 1, wherein when said notification unit gives the device power supply allowance to the one or more apparatuses in descending order of the group priorities, said notification unit sends a limitation notification which limits a duty ratio of a current to be supplied to the device together with the allowance notification to apparatuses which belong to a group in which the parameter associated with the power consumption values exceeds the upper limit value first, and wherein said control unit sets the device in the power supply ON state when the allowance notification is received from the server, and changes an operating condition of the apparatus according to the limitation notification when the limitation notification is received from the server.

3. The system according to claim 2, wherein the device is a heater, and wherein said control unit sets the device in the power supply ON state when the allowance notification is received from the server, and decreases a target temperature of the heater according to the limitation notification when the limitation notification is received from the server.

4. The system according to claim 2, wherein said plurality of apparatuses are a plurality of printing apparatuses, and wherein said control unit sets the device in the power supply ON state when the allowance notification is received from the server, and decreases a print speed according to the limitation notification when the limitation notification is received from the server.

5. The system according to claim 2, wherein the plurality of apparatuses are a plurality of printing apparatuses, and wherein said control unit sets the device in the power supply ON state when the allowance notification is received from the server, and prolongs a paper feed interval or a paper discharge interval according to the limitation notification when the limitation notification is received from the server.

6. The system according to claim 1, wherein the device is a heater, and wherein the operation state includes at least a standby state in which a temperature of the heater is maintained constant, and a heating state in which the heater is normally kept in a power supply ON state when the temperature of the heater is lower than a predetermined threshold.

7. A control method of a system for controlling total power consumption of a plurality of apparatuses, the system comprising a server and the plurality of apparatuses each incorporating a device, and in which the plurality of apparatuses control power supply ON and OFF states of the devices in accordance with an instruction from the server, the method comprising:

in the server,
collecting pieces of operation state information indicating operation states of the plurality of apparatuses and pieces of duration information indicating durations of the operation states from the plurality of apparatuses;
grouping, with reference to the pieces of operation state information collected in the collecting, the plurality of apparatuses into groups which respectively correspond to different operation states and respectively have different group priorities to be used when the server gives a device power supply allowance;
sending an allowance notification indicating the device power supply allowance to one or more apparatuses which belong to one or more groups in descending order of the group priorities within a range in which a parameter associated with power consumption values of the one or more apparatuses does not exceed an upper limit value which is predetermined in correspondence with a total power consumption amount of the plurality of apparatuses, wherein the allowance notification is sent to the one or more apparatuses in descending order of the group priorities within a range in which a number of the one or more apparatuses does not exceed the predetermined upper limit value, and when the device power supply allowance is given to the one or more apparatuses in descending order of the group priorities, the device power supply allowance is given in turn from apparatuses which have longer durations included in the pieces of operation state information collected in the collecting and which belong to a group in which the parameter associated with the power consumption values exceeds the upper limit value first; and in each of the plurality of apparatuses,
setting the device in a power supply ON state when the allowance notification is received from the server, and setting the device in a power supply OFF state when the allowance notification is not received from the server.

* * * * *